US008569417B2

(12) United States Patent
Backer et al.

(10) Patent No.: US 8,569,417 B2
(45) Date of Patent: Oct. 29, 2013

(54) MODIFIED POLYOLEFINS

(75) Inventors: Michael Backer, Barry (GB); Francois De Buyl, Hoeilaart (BE); Valerie Smits, Lobbes (BE); Damien Deheunynck, Braine l'Alleud (BE)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/001,668

(22) PCT Filed: Jul. 2, 2009

(86) PCT No.: PCT/EP2009/004798
§ 371 (c)(1),
(2), (4) Date: Apr. 21, 2011

(87) PCT Pub. No.: WO2010/000478
PCT Pub. Date: Jan. 7, 2010

(65) Prior Publication Data
US 2011/0190411 A1  Aug. 4, 2011

(30) Foreign Application Priority Data
Jul. 3, 2008  (GB) .................................. 0812186.5

(51) Int. Cl.
*C08F 255/00* (2006.01)
*C08F 255/02* (2006.01)
*C08F 8/12* (2006.01)
*C08F 8/42* (2006.01)

(52) U.S. Cl.
USPC .......................... 525/105; 525/106; 525/326.3

(58) Field of Classification Search
USPC ........................ 525/105, 106, 326.3
See application file for complete search history.

(56) References Cited

U.S. PATENT DOCUMENTS

| 3,075,948 A | 1/1963 | Santelli |
| 3,179,612 A | 4/1965 | Plueddemann |
| 3,258,477 A | 6/1966 | Plueddemann et al. |
| 3,414,551 A | 12/1968 | Reid et al. |
| 3,458,460 A | 7/1969 | Shepard et al. |
| 3,503,943 A | 3/1970 | Kresge et al. |
| 3,646,155 A | 2/1972 | Scott |
| 3,873,642 A | 3/1975 | Jezl |
| 3,873,643 A | 3/1975 | Wu et al. |
| 4,303,763 A | 12/1981 | Beasley |
| 4,481,322 A | 11/1984 | Godlewski et al. |
| 4,529,750 A | 7/1985 | Gimpel |
| 4,702,868 A | 10/1987 | Pontiff et al. |
| 4,709,084 A | 11/1987 | Pavlin et al. |
| 4,730,031 A | 3/1988 | Sato et al. |
| 4,755,262 A | 7/1988 | Matsunaga et al. |
| 4,795,785 A | 1/1989 | Ito et al. |
| 4,857,250 A | 8/1989 | Gale et al. |
| 4,921,916 A | 5/1990 | Howell et al. |
| 4,946,977 A | 8/1990 | Bernhardt et al. |
| 4,990,383 A | 2/1991 | Bergstrom et al. |
| 5,233,006 A | 8/1993 | Wolter et al. |
| 5,373,059 A | 12/1994 | Asanuma et al. |
| 5,382,633 A * | 1/1995 | Scott et al. ..................... 525/279 |
| 5,532,398 A | 7/1996 | Wolter et al. |
| 5,661,200 A | 8/1997 | Boudreaux, Jr. et al. |
| 5,684,171 A | 11/1997 | Wideman et al. |
| 5,852,099 A | 12/1998 | Vanel |
| 5,929,127 A | 7/1999 | Raetzsch et al. |

(Continued)

FOREIGN PATENT DOCUMENTS

| CA | 1099840 A1 | 4/1981 |
| CN | 1747976 A | 3/2006 |

(Continued)

OTHER PUBLICATIONS

Lin, Yao and Huang in Polymer 41,4537-4542 (2000) entitled 'Influences of grafting formulations and processing conditions on properties of silane grafted moisture crosslinked polypropylenes'.

Huang, Lu and Liu in J. Applied Polymer Science 78, 1233-1238 (2000) entitled 'Influences on grafting formulations and extrusion conditions on properties of silane grafted polypropylenes'.

Yang, Song, Zhao, Yang and She in Polymer Engineering and Science, 1004-1008 (2007) entitled 'Mechanism of a one-step method for preparing silane grafting and crosslinking polypropylene'.

(Continued)

*Primary Examiner* — Jeffrey Mullis
(74) *Attorney, Agent, or Firm* — Howard & Howard Attorneys PLLC

(57) ABSTRACT

The invention relates to a process for grafting hydrolysable silane groups to a polyolefin in which ethylene units, if present, form less than 50% by weight of the total polyolefin. The polyolefin is reacted with an unsaturated silane, having at least one hydrolysable group bonded to Si, or a hydrolysate thereof, in the presence of means capable of generating free radical sites in the polyolefin. The unsaturated silane has the formula R"—CH═CH—Z (I) or R"—C≡C—Z (II) in which Z represents an electron-withdrawing moiety substituted by a —SiR$_a$R'$_{(3-a)}$ group wherein R represents a hydrolysable group; R' represents a hydrocarbyl group having 1 to 6 carbon atoms; a has a value in the range 1 to 3 inclusive; and R" represents hydrogen or a group having an electron withdrawing or any other activation effect with respect to the —CH═CH— or —C≡C— bond. The use of an unsaturated silane of the formula R"—CH═CH—Z (I) or R"—C≡C—Z (II) in carrying out the grafting reaction on the polyolefin may give enhanced grafting yield compared to grafting with an olefinically unsaturated silane such as vinyltrimethoxysilane not containing an electron withdrawing moiety Z. The invention permits to provide a silane-modified polyolefin having a high grafting efficiency while limiting/preventing polymer degradation by chain scission. The silane-modified polyolefin can be further reacted with a polar surface, a filler or a polar polymer or reacted on itself to crosslink the polyolefin and obtain enhanced physical properties of the composites made thereof.

20 Claims, No Drawings

(56) References Cited

U.S. PATENT DOCUMENTS

| | | | |
|---|---|---|---|
| 6,013,715 | A | 1/2000 | Gornowicz et al. |
| 6,028,146 | A | 2/2000 | Kotlar et al. |
| 6,153,691 | A | 11/2000 | Gornowicz et al. |
| 6,177,519 | B1 | 1/2001 | Chung et al. |
| 6,380,316 | B1 | 4/2002 | Bahadur et al. |
| 6,479,580 | B1 | 11/2002 | Chorvath et al. |
| 6,500,883 | B1 | 12/2002 | Mack et al. |
| 6,590,032 | B2 | 7/2003 | Furukawa et al. |
| 6,590,036 | B2 | 7/2003 | Koike et al. |
| 6,590,039 | B1 | 7/2003 | Wang et al. |
| 6,632,888 | B2 | 10/2003 | Obrecht et al. |
| 6,774,255 | B1 | 8/2004 | Tardivat et al. |
| 6,841,694 | B2 | 1/2005 | Pfeiffer |
| 6,864,322 | B2 | 3/2005 | Gehlsen et al. |
| 6,864,323 | B2 | 3/2005 | Schlosser et al. |
| 6,984,747 | B2 | 1/2006 | Jacob et al. |
| 7,015,297 | B2 | 3/2006 | Schindler et al. |
| 7,041,744 | B2 | 5/2006 | Palmlof et al. |
| 7,074,876 | B2 | 7/2006 | Cruse et al. |
| 7,078,449 | B2 | 7/2006 | Pagano et al. |
| 7,238,740 | B2 | 7/2007 | Belin et al. |
| 7,241,824 | B2 | 7/2007 | Mangeret et al. |
| 8,008,524 | B2 | 8/2011 | Cruse et al. |
| 8,013,178 | B2 | 9/2011 | Klockmann et al. |
| 2002/0040101 | A1 | 4/2002 | Furukawa et al. |
| 2003/0114604 | A1 | 6/2003 | Schlosser et al. |
| 2003/0139621 | A1 | 7/2003 | Jacob et al. |
| 2003/0144403 | A1 | 7/2003 | Barruel et al. |
| 2005/0004386 | A1 | 1/2005 | Deschler et al. |
| 2005/0031813 | A1 | 2/2005 | Conrnette et al. |
| 2005/0119436 | A1 | 6/2005 | Ziche et al. |
| 2005/0131154 | A1 | 6/2005 | Cai et al. |
| 2005/0269737 | A1 | 12/2005 | Hogge et al. |
| 2005/0272867 | A1 | 12/2005 | Hogge et al. |
| 2005/0287300 | A1 | 12/2005 | Herrwerth et al. |
| 2006/0025506 | A1* | 2/2006 | Weller et al. ........... 524/263 |
| 2006/0240400 | A1* | 10/2006 | Yamato et al. ........... 435/4 |
| 2008/0216942 | A1* | 9/2008 | Hiraoka et al. ........... 156/145 |
| 2009/0143531 | A1 | 6/2009 | Ouhadi et al. |
| 2009/0186961 | A1 | 7/2009 | Araujo Da Silva et al. |
| 2009/0234066 | A1 | 9/2009 | Araujo Da Silva et al. |
| 2009/0264584 | A1 | 10/2009 | Walia et al. |
| 2009/0292044 | A1 | 11/2009 | Kawazura et al. |
| 2010/0016500 | A1 | 1/2010 | Sone et al. |
| 2010/0040927 | A1 | 2/2010 | Yoshida et al. |
| 2010/0168343 | A1* | 7/2010 | Harris et al. ........... 525/283 |
| 2011/0152458 | A1 | 6/2011 | Araujo Da Silva et al. |
| 2011/0172367 | A1 | 7/2011 | Backer et al. |
| 2011/0178198 | A1 | 7/2011 | Backer et al. |
| 2011/0287205 | A1 | 11/2011 | Klockmann et al. |
| 2012/0059121 | A1 | 3/2012 | Backer et al. |
| 2012/0065319 | A1 | 3/2012 | Backer et al. |
| 2012/0283346 | A1 | 11/2012 | Backer et al. |
| 2012/0283362 | A1 | 11/2012 | Backer et al. |
| 2012/0283388 | A1 | 11/2012 | Backer et al. |
| 2012/0289620 | A1 | 11/2012 | Deheunynck et al. |

FOREIGN PATENT DOCUMENTS

| | | |
|---|---|---|
| DE | 10223073 C1 | 10/2003 |
| DE | 102006059295 A1 | 6/2008 |
| EP | 0225186 A2 | 6/1987 |
| EP | 0245938 A2 | 11/1987 |
| EP | 0276790 A2 | 8/1988 |
| EP | 0372561 A2 | 6/1990 |
| EP | 0581150 A2 | 2/1994 |
| EP | 0735088 A1 | 10/1996 |
| EP | 0776945 A2 | 6/1997 |
| EP | 0900801 A1 | 3/1999 |
| EP | 0943635 A1 | 9/1999 |
| EP | 0451709 B1 | 12/1999 |
| EP | 1018533 A2 | 7/2000 |
| EP | 1022302 A2 | 7/2000 |
| EP | 1050548 A1 | 11/2000 |
| EP | 0450624 B1 | 9/2001 |
| EP | 1134251 A1 | 9/2001 |
| EP | 1270581 A2 | 1/2003 |
| EP | 1318153 A1 | 6/2003 |
| EP | 1323779 A1 | 7/2003 |
| EP | 1354912 A1 | 10/2003 |
| EP | 1375569 A1 | 1/2004 |
| EP | 0809672 B1 | 6/2004 |
| EP | 1619214 A1 | 1/2006 |
| EP | 1683801 A2 | 7/2006 |
| EP | 1721930 A1 | 11/2006 |
| EP | 1818186 A1 | 8/2007 |
| EP | 1942131 A1 | 7/2008 |
| EP | 0958298 B2 | 10/2008 |
| EP | 2039705 A1 | 3/2009 |
| EP | 2085419 A1 | 8/2009 |
| GB | 957917 A | 5/1964 |
| GB | 1020740 | 2/1966 |
| GB | 1407827 | 9/1975 |
| GB | 2134530 A | 8/1984 |
| GB | 2192891 A | 1/1988 |
| GB | 2202537 A | 2/1988 |
| JP | 59-147035 A | 8/1984 |
| JP | 3143979 A | 6/1991 |
| JP | 05-070529 A | 3/1993 |
| JP | 06172459 | 6/1994 |
| JP | 2007-308653 A | 11/2007 |
| JP | 2007329069 | 12/2007 |
| JP | 2008097868 A | 4/2008 |
| JP | 2008-106118 A | 5/2008 |
| JP | 2008-142112 A | 6/2008 |
| JP | 2008-184545 | 8/2008 |
| WO | WO 8705916 A2 | 10/1987 |
| WO | WO 00/52073 A1 | 9/2000 |
| WO | WO 0052071 A1 | 9/2000 |
| WO | WO 0052072 A1 | 9/2000 |
| WO | WO 00/63293 A1 | 10/2000 |
| WO | WO 01/49781 A1 | 7/2001 |
| WO | WO 01/49782 A1 | 7/2001 |
| WO | WO 01/49783 A1 | 7/2001 |
| WO | WO 02/22728 A1 | 3/2002 |
| WO | WO 03/091314 A1 | 11/2003 |
| WO | WO 2004072135 A1 | 8/2004 |
| WO | WO 2004/078813 A2 | 9/2004 |
| WO | WO 2005/001037 A2 | 1/2005 |
| WO | WO 2005/007066 A2 | 1/2005 |
| WO | WO 2005103061 A1 | 11/2005 |
| WO | WO 2006/019468 | 2/2006 |
| WO | WO 2006015010 A2 | 2/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007008765 A2 | 1/2007 |
| WO | WO 2007/014687 A1 | 2/2007 |
| WO | WO 2007/061550 A1 | 5/2007 |
| WO | WO 2007147687 A1 | 12/2007 |
| WO | WO 2008/004686 A1 | 1/2008 |
| WO | WO 2008/042418 A1 | 4/2008 |
| WO | WO 2009/073274 A1 | 6/2009 |
| WO | WO 2010/003007 A2 | 1/2010 |
| WO | WO 2010/005525 A1 | 1/2010 |
| WO | WO 2010000477 A1 | 1/2010 |
| WO | WO 2010000479 A1 | 1/2010 |
| WO | WO 2010/125123 A1 | 11/2010 |
| WO | WO 2010/125124 A1 | 11/2010 |
| WO | WO 2011/083043 A1 | 7/2011 |
| WO | WO 2011/083044 A1 | 7/2011 |
| WO | WO 2011/083045 A1 | 7/2011 |
| WO | WO 2011/083046 A1 | 7/2011 |

OTHER PUBLICATIONS

English language abstract and equivalent for EP 0245938 extracted from the espacenet.com database on Jul. 13, 2011, 28 pages.

English language abstract and equivalent for EP 1318153 extracted from the espacenet.com database on Jul. 13, 2011, 15 pages.

English language abstract and translation for JP 06172459 extracted from the PAJ database on Jul. 13, 2011, 25 pages.

English language abstract and translation for JP 2007329069 extracted from the PAJ database on Jul. 13, 2011, 26 pages.

(56) References Cited

OTHER PUBLICATIONS

English language abstract and equivalent for JP 2008097868 extracted from the espacenet.com database on Jul. 13, 2011, 33 pages.
International Search Report for Application No. PCT/EP2009/004797 dated Sep. 4, 2009, 11 pages.
International Search Report for Application No. PCT/EP2009/004798 dated Sep. 1, 2009, 6 pages.
International Search Report for Application No. PCT/EP2009/004799 dated Sep. 9, 2009, 9 pages.
English language abstract for JP 59-147035 extracted from the PAJ database on Oct. 31, 2012, 9 pages.
English language abstract and translation for JP 2007-308653 extracted from the PAJ database on Oct. 31, 2012, 71 pages.
International Search Report for Application No. PCT/EP2010/070481 dated Feb. 4, 2011, 3 pages.
English language abstract for DE 10223073 extracted from the espacenet.com database on Apr. 9, 2012, 10 pages.
English language abstract for EP 0450624 extracted from the espacenet.com database on Apr. 9, 2012, 36 pages.
English language abstract for EP 0451709 extracted from the espacenet.com database on Apr. 9, 2012, 24 pages.
English language abstract for EP 0735088 extracted from the espacenet.com database on Apr. 9, 2012, 13 pages.
English language abstract for EP 1683801 extracted from the espacenet.com database on Apr. 9, 2012, 49 pages.
English language abstract for JP 2008-106118 extracted from the PAJ database on Apr. 9, 2012, 27 pages.
English language abstract and translation for JP 2008-184545 extracted from the PAJ database on Apr. 9, 2012, 34 pages.
English language abstract for WO 01/49781 extracted from the espacenet.com database on Apr. 9, 2012, 49 pages.
English language abstract for WO 01/49782 extracted from the espacenet.com database on Apr. 9, 2012, 44 pages.
English language abstract for WO 01/49783 extracted from the espacenet.com database on Apr. 9, 2012, 36 pages.
English language abstract for WO 02/22728 extracted from the espacenet.com database on Apr. 9, 2012, 41 pages.
English language abstract for WO 2006/125532 extracted from the espacenet.com database on Apr. 9, 2012, 40 pages.
English language abstract for WO 2006/125533 extracted from the espacenet.com database on Apr. 9, 2012, 53 pages.
English language abstract for WO 2006/125534 extracted from the espacenet.com database on Apr. 9, 2012, 53 pages.
International Search Report for Application No. PCT/EP2010/055754 dated Oct. 15, 2010, 3 pages.
International Search Report for Application No. PCT/EP2010/055757 dated Jun. 7, 2010, 4 pages.
English language abstract and translation extracted for JP 05-070529 from the PAJ database on Oct. 31, 2012, 76 pages.
English language abstract for EP 0735088 extracted from the espacenet.com database on Nov. 5, 2012, 13 pages.
English language abstract and machine-assisted English translation for DE 102006059295 extracted from the espacenet.com database on Nov. 5, 2012, 39 pages.
English language abstract for JP 3143979 extracted from the espacenet.com database on Nov. 5, 2012, 12 pages.
March's Advanced Organic Chemistry, 5th Edition, John Wiley & Sons, NY 2001, at chapter 15-58, pp. 1062-1063.
B.C. Ranu et al., "Significant rate acceleration of the aza-Michael reaction in water", Tetrahedron Letters 48 (2007), pp. 141-143.
International Search Report for Application No. PCT/EP2010/070480 dated Mar. 4, 2011, 4 pages.
International Search Report for Application No. PCT/EP2010/070482 dated Feb. 2, 2011, 4 pages.
The Vanderbilt Rubber Handbook (1978), pp. 344-346.
Do Hung Han et al., "Crosslinking and degradation of polypropylene by electron beam irradiation in the presence of trifunctional monomers", Radiation Physics and Chemistry 69 (2004) 239-244.
Coiai S. et al., "Control of Degradation Reactions during Radical Functionalization of Polypropylene in the Melt", vol. 37, No. 22, Nov. 2, 2004, pp. 8414-8423.
Deng Changfu et al., "Grafting of Maleic Anhydride onto Hyperbranched Polyethylene and Suppression of Chain Degradation and Crosslinking Side Reactions", No. 5, 2008, pp. 435-441.
Liu et al., "Reactive Adsorption of Aminosilane onto the Glycidyl Methacrylate Graft-Copolymerized Poly (tetrafluoroethylene) Film Surface for Adhesion Enhancement with Evaporated Copper", Journal of Polymer Science: Part A Polymer Chemistry, vol. 38, No. 1, Jan. 2000, pp. 80-89.
English language abstract and machine-assisted English translation for JP 2008-142112 extracted from the PAJ database on Jul. 25, 2013, 24 pages.
English language abstract for WO 2008/004686 extracted from the espacenet.com database on Jul. 25, 2013, 50 pages.

\* cited by examiner

MODIFIED POLYOLEFINS

RELATED APPLICATIONS

This application claims priority to and all the advantages of International Patent Application No. PCT/EP2009/004798, filed on Jul. 2, 2009, which claims priority to Great Britain Patent Application No. GB 0812186.5, filed on Jul. 3, 2008.

This invention relates to a process of grafting hydrolysable and crosslinkable groups onto polyolefins and to the graft polymers produced, and to a process of crosslinking the grafted polymers. In particular it relates to a process of grafting hydrolysable silane groups onto polyolefins.

Polyolefins possess low polarity which is an important benefit for many applications. However, in some instances, the non-polar nature of polyolefins might be a disadvantage and limit their use in a variety of end-uses. For example due to their chemical inertness, functionalisation and crosslinking of polyolefins are difficult. The modification of polyolefin resins by grafting specific compound onto polymer backbone to improve properties is known. BE 652324 and U.S. Pat. No. 3,414,551 describe a process for reacting maleic anhydride with polypropylene. U.S. Pat. No. 3,873,643 describes the grafting of cyclic ethylenically unsaturated carboxylic acids and anhydrides onto polyethylene, under melt conditions and in presence of a peroxide. Those types of monomer are providing polarity to polymer chain but will not gives access to crosslinking.

U.S. Pat. No. 3,646,155 describes crosslinking of polyolefins, particularly polyethylene, by reaction (grafting) of the polyolefin with an unsaturated hydrolysable silane at a temperature above 140° C. and in the presence of a compound capable of generating free radical sites in the polyolefin. Subsequent exposure of the reaction product to moisture and a silanol condensation catalyst effects crosslinking. This process has been extensively used commercially for crosslinking polyethylene. EP-B-809672, EP1942131, EP0276790, WO2007/147687, GB2134530 and U.S. Pat. No. 7,041,744 are further examples of patents describing such grafting and crosslinking process. The unsaturated hydrolysable silane used is generally vinyltrimethoxysilane. U.S. Pat. No. 6,864,323 teaches to improve scorching performance by adding a small amount of a further compound, called compound (iii) which may be a conjugated hydrocarbon and/or at least one organofunctional silane of the general formula R-Xn-C(R)=C(R)—C(R)=C(R)-Xn-Si(R1)m(OR2)(3-m). The groups R are identical or different and R is a hydrogen atom or an alkyl group having from 1 to 3 carbon atoms or an aryl group or an aralkyl group, preferably a methyl group or a phenyl group, R(1) is a linear or branched alkyl group having from 1 to 4 carbon atoms, R(2) is a linear, branched, or cyclic alkyl group having from 1 to 8 carbon atoms, preferably a methyl, ethyl, n-propyl, or isopropyl group, the groups X are identical or different, and X is a group selected from the series —CH2-, —(CH2)2-, —(CH2)3-, —O(O)C(CH2)3- and —C(O)O—(CH2)3-, and n is 0 or 1, and m is 0, 1, 2 or 3.

The technology described in these patents is efficient to functionalize and crosslink polyethylenes. However when trying to functionalize polypropylene using the above technologies, the grafting is accompanied by degradation of the polymer by chain scission in the β-position or so-called β-scission. Such degradation results in a decrease of the viscosity of the material to be processed. Furthermore, this degradation results in a polymer having inferior performance compare to the starting material.

JP-A-1994-172459 describes producing a modified polyolefin with a vinyl monomer using peroxide in the presence of a co-agent such as an aromatic compound which prevents the breakage of the polymer chain. Vinylsilanes are described for use with polyethylene. However maleic anhydride was described as being the preferred monomer for use with polypropylene. EP-A-225186 also describes styrene used in combination with a non-silane monomer to prevent the polymer degradation. U.S. Pat. No. 6,028,146 describes grafting monomers onto polypropylene by mixing upon heating the polypropylene with an unsaturated epoxy compound, styrene and a peroxide.

An article by Liu, Yao and Huang in Polymer 41, 4537-4542 (2000) entitled 'Influences of grafting formulations and processing conditions on properties of silane grafted moisture crosslinked polypropylenes' describes the grafting of polypropylene with unsaturated silanes and the degree of crosslinking (gel percentage) achieved and extent of polypropylene degradation. The unsaturated silanes described are methacryloxypropyltrimethoxysilane and vinyltriethoxysilane. An article by Huang, Lu and Liu in J. Applied Polymer Science 78, 1233-1238 (2000) entitled 'Influences of grafting formulations and extrusion conditions on properties of silane grafted polypropylenes' describes a similar grafting process using a twin screw extruder. An article by Lu and Liu in China Plastics Industry, Vol. 27, No. 3, 27-29 (1999) entitled 'Hydrolytic crosslinking of silane graft onto polypropylene' is similar. An article by Yang, Song, Zhao, Yang and She in Polymer Engineering and Science, 1004-1008 (2007) entitled 'Mechanism of a one-step method for preparing silane grafting and crosslinking polypropylene' describes silane grafting and crosslinking in a one-step method in a twin screw reactive extruder. The use of a co-agent such as styrene inhibits polymer degradation but there is still a need for improved grafting efficiency of the silane.

The object of the present invention is to provide a silane-modified polyolefin having a particularly high grafting efficiency. In one embodiment, the high grafting efficiency can be obtained while limiting polymer degradation by chain scission if particularly highly reactive silanes are combined with an appropriate co-agent. The silane-modified polyolefin can be further reacted with polar groups present on the surface of fillers or attached to another polymer, or reacted on itself to crosslink the silane-modified polyolefin and form composite materials with improved properties, as this will be demonstrated troughs examples in the present application. Alternatively, the silane can be first used to treat a filler and the treated filler is then used for grafting to the polymer.

A process according to the invention for grafting hydrolysable silane groups to a polyolefin in which ethylene units, if present, form less than 50% by weight of the total units in the polyolefin, comprises reacting the polymer with an unsaturated silane, having at least one hydrolysable group bonded to Si, or a hydrolysate thereof, in the presence of means for generating free radical sites in the polyolefin, characterized in that the silane has the formula R"—CH=CH—Z (I) or R"—C≡C—Z (II) in which Z represents an electron-withdrawing moiety substituted by a —SiR$_a$R'$_{(3-a)}$ group wherein R represents a hydrolysable group; R' represents a hydrocarbyl group having 1 to 6 carbon atoms; a has a value in the range 1 to 3 inclusive; and R" represents hydrogen or a group having an electron withdrawing or any other activation effect with respect to the —CH=CH— or —C≡C— bond.

The means for generating free radical sites in the polyolefin generally comprises a compound capable of generating free radicals, and thus capable of generating free radical sites in the polyolefin. Other means include applying shear or electron beam.

We have found according to the invention that the use of an unsaturated silane of the formula R"—CH=CH—Z (I) or R"—C≡C—Z (II) containing an electron withdrawing moiety Z in carrying out the grafting reaction on the polyolefin gives enhanced grafting yield compared to grafting with an olefinically unsaturated silane such as vinyltrimethoxysilane not containing an electron withdrawing moiety Z. The enhanced grafting efficiency can lead to a silane grafted polymer with enhanced physical properties, such as, e.g., coupling and adhesion properties, heat resistance, impact resistance, and/or higher degree of crosslinking, and/or faster rate of crosslinking, in the presence of moisture and possibly of a silanol condensation catalyst, although this latter is not mandatory.

An electron-withdrawing moiety is a chemical group which draws electrons away from a reaction center. The electron-withdrawing moeity Z can in general be any of the groups listed as dienophiles in Michael B. Smith and Jerry March; March's Advanced Organic Chemistry, $5^{th}$ edition, John Wiley & Sons, New York 2001, at Chapter 15-58 (page 1062) provided that the groups are capable of being substituted by a —$SiR_aR'_{(3-a)}$ group. The moiety Z can be especially a C(=O)R*, C(=O)OR*, OC(=O)R*, C(=O)Ar moiety in which Ar represents arylene substituted by a —$SiR_aR'_{(3-a)}$ group and R* represents a hydrocarbon moiety substituted by a —$SiR_aR'_{(3-a)}$ group. Z can also be a C(=O)—NH—R* moiety. Preferred silanes include those of the form R"—CH=CH—X—Y—$SiR_aR'_{(3-a)}$ (III) or R"—C≡C—X—Y—$SiR_aR'_{(3-a)}$ (IV) in which X represents a chemical linkage having an electron withdrawing effect with respect to the —CH=CH— or a —C≡C— bond such as a carboxyl, carbonyl, or amide linkage, and Y represents a divalent organic spacer linkage comprising at least one carbon atom separating the linkage X from the Si atom.

Electron-donating groups, for example alcohol group or amino group may decrease the electron withdrawing effect. In one embodiment, unsaturated silane (I) or (II) is free of such group. Steric effects for example steric hindrance of a terminal alkyl group such as methyl, may affect the reactivity of the olefinic or acetylenic bond. In one embodiment, the unsaturated silane (I) or (II) is free of such sterically hindering group. Groups enhancing the stability of the radical formed during the grafting reaction, for example double bond or aromatic group conjugated with the unsaturation of the silane, are preferably present in the unsaturated silane (I) or (II). The latter groups have an activation effect with respect to the —CH=CH— or —C≡C— bond.

The invention includes a polyolefin grafted with hydrolysable silane groups produced by the above process. When the unsaturated silane contains a CH=CH— bond, the grafted polyolefin is characterized in that the polyolefin contains grafted moieties of the formula R"—CH(PP)—$CH_2$—Z and/or grafted moieties of the formula R"—$CH_2$—CH(PP)—Z wherein Z represents an electron-withdrawing moiety substituted by a —$SiR_aR'_{(3-a)}$ group wherein R represents a hydrolysable group; R' represents a hydrocarbyl group having 1 to 6 carbon atoms; a has a value in the range 1 to 3 inclusive; R" represents hydrogen or a group having an electron withdrawing effect; and PP represents a polyolefin chain in which less than 50% by weight of the total units in the polyolefin are ethylene units.

The polyolefin, grafted with hydrolysable silane groups can be further reacted with polar groups present on the surface of fillers or attached to another polymer, or reacted on itself to crosslink the silane-modified polyolefin and form composite materials with improved properties, as this will be demonstrated troughs examples in the present application. Alternatively, the filler may be pre treated with the unsaturated silane then reacted with the polyolefin.

The invention thus also includes a process for crosslinking a polyolefin in which ethylene units, if present, form less than 50% by weight of the total units in the polyolefin, characterized in that a grafted polyolefin produced as described above is exposed to moisture in the possible presence of a silanol condensation catalyst.

Each hydrolysable group R in the —$SiR_aR'_{(3-a)}$ group of the unsaturated silane of the formula R"—CH=CH—Z (I) or R"—C≡C—Z (II) is preferably an alkoxy group, although alternative hydrolysable groups such as acyloxy, for example acetoxy, ketoxime, for example methylethylketoxime, alkyllactato, for example ethyllactato, amino, amido, aminoxy or alkenyloxy groups can be used. Alkoxy groups R generally each have a linear or branched alkyl chain of 1 to 6 carbon atoms and most preferably are methoxy or ethoxy groups. The value of a in the silane (I) or (II) can for example be 3, for example the silane can be a trimethoxy silane, to give the maximum number of hydrolysable and/or crosslinking sites. However each alkoxy group generates a volatile organic alcohol when it is hydrolysed, and it may be preferred that the value of a in the silane (I) or (II) is 2 or even 1 to minimize the volatile organic material emitted during crosslinking. The group R' if present is preferably a methyl or ethyl group.

The unsaturated silane can be partially hydrolysed and condensed into oligomers containing siloxane linkages. For most end uses it is preferred that such oligomers still contain at least one hydrolysable group bonded to Si per unsaturated silane monomer unit so that the grafted polymer has sufficient reactivity towards itself and towards polar surfaces and materials. If the grafted polymer is to be crosslinked in a second step, it is usually preferred that hydrolysis and condensation of the silane before grafting will be minimized.

In the unsaturated silane of the formula R"—CH=CH—X—Y—$SiR_aR'_{(3-a)}$ (III) or R"—C≡C—X—Y—$SiR_aR'_{(3-a)}$ (IV), the electron withdrawing linkage X is preferably a carboxyl linkage. Preferred silanes thus have the formula R"—CH=CH—C(=O)O—Y—$SiR_aR'_{(3-a)}$ (V) and R"—C≡C—C(=O)O—Y—$SiR_aR'_{(3-a)}$ (VI). The spacer linkage Y can in general be a divalent organic group comprising at least one carbon atom, for example an alkylene group such as methylene, ethylene or propylene, or an arylene group, or a polyether chain, e.g., polyethylene glycol or polypropylene glycol. When the group R" represents hydrogen and Y is an alkylene linkage, the moiety R"—CH=CH—C(=O)O—Y— in the unsaturated silane (V) is an acryloxyalkyl group. We have found that acryloxyalkylsilanes graft to polyolefins more readily than vinylsilanes, alkylsilanes or methacryloxyalkylsilanes. Examples of preferred acryloxyalkylsilanes are γ-acryloxypropyltrimethoxysilane, acryloxymethyltrimethoxysilane, acryloxymethylmethyldimethoxysilane, acryloxymethyldimethylmethoxysilane, γ-acryloxypropylmethyldimethoxysilane and γ-acryloxypropyldimethylmethoxysilane. γ-Acryloxypropyltrimethoxysilane can be prepared from allyl acrylate and trimethoxysilane by the process described in U.S. Pat. No. 3,179,612. γ-acryloxypropylmethyldimethoxysilane and γ-acryloxypropyldimethylmethoxysilane can similarly be prepared from allyl acrylate and methyldimethoxysilane or dimethylmethoxysilane respectively. Acryloxymethyltrimethoxysilane can be prepared from acrylic acid and chloromethyltrimethoxysilane by the process described in U.S. Pat. No. 3,179,612.

In the unsaturated silane of formula (III) or (IV), the electron withdrawing linkage X can alternatively be a C(=O)—NH—Y—$SiR_aR'_{(3-a)}$ moiety. When the group R" represents a carboxylic acid group, the unsaturated silane (III) is N-(trimethylsilylpropyl)maleamic acid.

The group R" in the silane of the formula R"—CH=CH—X—Y—SiR$_a$R'$_{(3-a)}$ (III) or R"—C≡C—X—Y—SiR$_a$R'$_{(3-a)}$ (IV) can alternatively be an alkenyl group, for example R" can be a propenyl group, X a C(=O)O group and Y an alkylene group, with the silane being an alkoxysilylalkyl ester of sorbic acid.

The group R" in the unsaturated silane (III) or (IV) can alternatively be an electron withdrawing group of the formula —X—Y—SiR$_a$R'$_{(3-a)}$, for example an electron withdrawing group where the linkage —X— is a carboxyl linkage. The unsaturated silane can thus be of the form R$_a$R'$_{(3-a)}$Si—Y—O(O=)C—CH=CH—C(=O)O—Y—SiR$_a$R'$_{(3-a)}$, or R$_a$R'$_{(3-a)}$Si—Y—O(O=)C—C≡C—C(=O)O—Y—SiR$_a$R'$_{(3-a)}$. The unsaturated silane (III) can comprise a bis(trialkoxysilylalkyl) fumarate (trans-isomer) and/or a bis(trialkoxysilylalkyl) maleate (cis-isomer). Examples are bis-(γ-trimethoxysilylpropyl) fumarate.

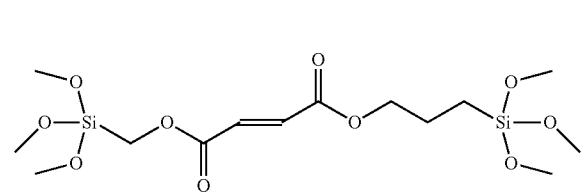

and bis-(γ-trimethoxysilylpropyl) maleate

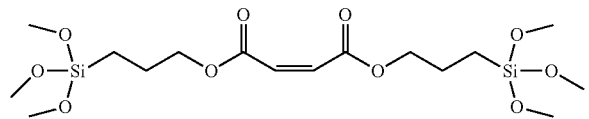

Their preparation is described in U.S. Pat. No. 3,179,612.

Alternatively, the bis-silanes (III) or (IV) can be asymmetrical e.g. with Y, R and R' being different on each side of the molecule.

Alternatively the electron withdrawing group R" in the unsaturated silane (III) or (IV) can be of the form XH or XR*, where R* is an alkyl group. The unsaturated silane can be a mono(trialkoxysilylalkyl) fumarate and/or a mono(trialkoxysilylalkyl) maleate, or can be a trialkoxysilylalkyl ester of an alkyl monofumarate and/or an alkyl monomaleate.

The unsaturated silane can also be of the form R$_a$R'$_{(3-a)}$Si—Y—O(O=)C—C≡C—C(=O)O—Y—SiR$_a$R'$_{(3-a)}$. Example is bis-(γ-trimethoxysilylpropyl)-2-butynedioate

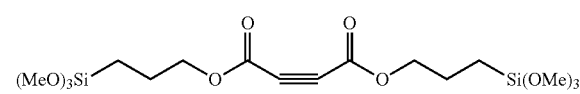

Alternatively methyl substituted cis- and trans-butenedioic acid silanes, such as the derivatives of citraconic acid A and mesaconic acid B and isomers such as the exo-alkylidene substituted itaconic acid derivatives C, in which at least one of the groups R shown below

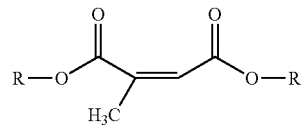

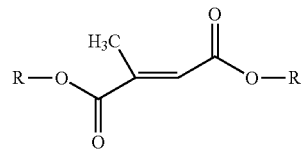

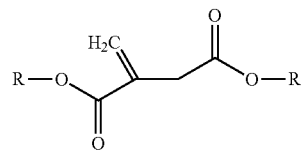

is a —Y—SiR$_a$R'$_{(3-a)}$ group as defined above, can be used as the unsaturated silane. Such unsaturated silanes can be prepared in accordance with U.S. Pat. No. 3,179,612 via substitution reaction of the ammonium carboxylate salt by a haloalkyl silane or in case of Y being a propyl spacer via hydrosilylation reaction of the according alkylesters.

In general, all unsaturated silanes which are silylalkyl esters of an unsaturated acid can be prepared from the unsaturated acid, for example acrylic, maleic, fumaric, sorbic or cinnamic acid, propynoic or butyne-dioic acid, by reaction of the corresponding carboxylate salt with the corresponding chloroalkylalkoxysilane. In a first step, the alkali salt of the carboxylic acid is formed either by reaction of the carboxylic acid with alkali alkoxide in alcohol, as described e.g. in U.S. Pat. No. 4,946,977, or by reaction of the carboxylic acid with aqueous base and subsequent removal of the water via azeotropic distillation, as described e.g. in WO-2005/103061. A trialkyl ammonium salt of the carboxylic acid can be formed by direct reaction of the free carboxylic acid with trialkyl amine, preferentially tributyl amine or triethyl amine as described in U.S. Pat. No. 3,258,477 or U.S. Pat. No. 3,179,612. In a second step the carboxylic acid salt is then reacted via nucleophilic substitution reaction with the chloroalkylalkoxysilane under formation of the alkali chloride or trialkylammonium chloride as a by-product. This reaction can be performed with the chloroalkylalkoxysilane under neat condition or in solvents such as benzene, toluene, xylene, or a similar aromatic solvent, as well as methanol, ethanol, or another alcohol-type solvent. It is preferable to have a reaction temperature within the range of 30 to 180° C., preferably within the range of 100 to 160° C. In order to speed up this replacement reaction, phase transfer catalysts of various kinds can be used. Preferable phase transfer catalysts are the following: tetrabutylammonium bromide (TBAB), trioctylmethylammonium chloride, Aliquat® 336 (Cognis GmbH) or similar quaternary ammonium salts (as e.g. used in U.S. Pat. No. 4,946,977), tributylphosphonium chloride (as e.g. used in U.S. Pat. No. 6,841,694), guanidinium salts (as e.g. used in EP0900801) or cyclic unsaturated amines as 1,8-diazabicyclo[5.4.0]undeca-7-ene (DBU, as e.g. used in WO2005/103061). If necessary, the following polymerization inhibitors can be used throughout preparation and/or purification steps: hydroquinones, phenol compounds such as methoxyphenol and 2,6-di-t-butyl 4-methylphenol, phenothiazine, p-nitrosophenol, amine-type compounds such as e.g. N,N'-diphenyl-p-phenylenediamine or sulfur containing compounds as described in but not limited to the patents cited above.

Blends of unsaturated silanes can be used, for example a blend of γ-acryloxypropyltrimethoxysilane with acryloxymethyltrimethoxysilane or a blend of γ-acryloxypropyltrimethoxysilane and/or acryloxymethyltrimethoxysilane with an unsaturated silane containing no electron withdrawing groups such as vinyltrimethoxysilane or with an acryloxysilane containing 1 or 2 Si-alkoxy groups such as acryloxymethylmethyldimethoxysilane, acryloxymethyldimethylmethoxysilane, γ-acryloxypropylmethyldimethoxysilane or γ-acryloxypropyldimethylmethoxysilane.

The unsaturated silane (I) or (II) should be present in an amount sufficient to graft silane groups to the polymer. In some embodiments, other silane compounds are added for example for adhesion promotion but it is preferred that the major part of silane compounds present during the process is the unsaturated silane (I) or (II) so as to obtain efficient grafting. Preferably, unsaturated silane (I) or (II) forms at least 50% by weight, preferably at least 60% by weight of the silane compounds present in the process.

The amount of unsaturated silane (I) or (II) present during the grafting reaction is generally at least 0.2% by weight of the total composition and can be up to 20% or more. By total composition we mean the starting composition containing all ingredients, including polymer, silane, filler, catalyst etc which are brought together to form the reacting mixture.

Preferably the unsaturated silane (I) or (II) is present at 0.5 to 15.0% by weight of the total composition. Most preferably, the unsaturated silane (I) or (II) is present at 0.5 to 10.0% by weight of the total composition.

The polyolefin is usually a polymer of an olefin having 3 to 18 carbon atoms such as an alpha-olefin of the formula $CH_2=CHQ$ where Q is a linear or branched alkyl group having 1 to 16, more preferably 1 to 8 carbon atoms. The polyolefin can for example be a polymer of propene (propylene), 1-butene, 1-hexene, 1-octene, 4-methyl-pentene-1 or 2-methyl-propene-1 (isobutylene). Propylene polymers are an important class of polymers, particularly polypropylene. Polypropylene is a commodity polymer which is broadly available and of low cost. It has low density and is easily processed and versatile. Most commercially available polypropylene is isotactic polypropylene, but the process of the invention is applicable to atactic and syndiotactic polypropylene as well as to isotactic polypropylene. Isotactic is prepared for example by polymerization of propene using a Ziegler-Natta catalyst or a metallocene catalyst. The invention can provide a functionalized and/or crosslinked polypropylene of improved properties from commodity polypropylene. The polyolefin can alternatively be a polymer of a diene, such as a diene having 4 to 18 carbon atoms and at least one terminal double bond, for example butadiene or isoprene. The polyolefin can be a copolymer or terpolymer, particularly a copolymer or terpolymer comprising at least 50% by weight units of an olefin having 3 to 18 carbon atoms, for example a copolymer of at least 50% by weight propylene with ethylene or an alpha-olefin having 4 to 18 carbon atoms, or with an acrylic monomer such as acrylic acid, methacrylic acid, acrylonitrile, methacrylonitrile or an ester of acrylic or methacrylic acid and an alkyl or substituted alkyl group having 1 to 16 carbon atoms, for example ethyl acrylate, methyl acrylate or butyl acrylate, or a copolymer with vinyl acetate. The polyolefin can be a terpolymer for example a propylene ethylene diene terpolymer. Alternatively, the polyolefin can be a diene polymer such as polybutadiene, polyisoprene or a copolymer of butadiene with styrene, or a terpolymer of butadiene with ethylene and styrene or with acrylonitrile and styrene. The polyolefin can be heterophasic, for example a propylene ethylene block copolymer.

Preferably the polyolefin should have a melt flow rate (MFR 2.16 kg/230° C. according to method ISO1133) before reaction with the silane of at least 0.5 g/10 min. A mixture of different polyolefins can be used. The unsaturated silane and the compound capable of generating free radical sites in the polyolefin can be mixed with one type of polyolefin to form a masterbatch which can subsequently be mixed with a different type of polyolefin. For example microporous polypropylene is very effective in mixing with liquid additives to form a masterbatch, which can be mixed with bulk polypropylene or with a different alpha-olefin polymer. Microporous polyethylene is also very effective in mixing with liquid additives to form a masterbatch, and such a masterbatch can be mixed with an alpha-olefin polymer such as polypropylene in the process of the invention provided that the polyethylene is miscible with the polyolefin and the proportion of ethylene units in the resulting polyolefin composition is less than 50% by weight.

The compound capable of generating free radical sites in the polyolefin is preferably an organic peroxide, although other free radical initiators such as azo compounds can be used. Preferably the radical formed by the decomposition of the free-radical initiator is an oxygen-based free radical. It is more preferable to use hydroperoxides, carboxylic peroxyesters, peroxyketals, dialkyl peroxides and diacyl peroxides, ketone peroxides, diaryl peroxides, aryl-alkyl peroxides, peroxydi carbonates, peroxyacids, acyl alkyl sulfonyl peroxides and monoperoxydicarbonates. Examples of preferred peroxides include dicumyl peroxide, 2,5-dimethyl-2,5-di-(tert-butylperoxy)hexane, di-tert-butyl peroxide, 2,5-dimethyl-2,5-di-(tert-butylperoxy)hexyne-3,3,6,9-triethyl-3,6,9-trimethyl-1,4,7-triperoxonane, benzoyl peroxide, 2,4-dichlorobenzoyl peroxide, tert-butyl peroxyacetate, tert-butyl peroxybenzoate, tert-amylperoxy-2-ethylhexyl carbonate, tert-butylperoxy-3,5,5-trimethylhexanoate, 2,2-di(tert-butylperoxy)butane, tert-butylperoxy isopropyl carbonate, tert-buylperoxy-2-ethylhexyl carbonate, butyl 4,4-di(tert-buylperoxy)valerate, di-tert-amyl peroxide, tert-butyl peroxy pivalate, tert-butyl-peroxy-2-ethyl hexanoate, di(tertbutylperoxy)cyclohexane, tertbutylperoxy-3,5,5-trimethylhexanoate, di(tertbutylperoxyisopropyl)benzene, cumene hydroperoxide, tert-butyl peroctoate, methyl ethyl ketone peroxide, tert-butyl α-cumyl peroxide, 2,5-dimethyl-2,5-di(peroxybenzoate)hexyne-3, 1,3- or 1,4-bis(t-butylperoxyisopropyl)benzene, lauroyl peroxide, tert-butyl peracetate, and tert-butyl perbenzoate. Examples of azo compounds are azobisisobutyronitrile and dimethylazodiisobutyrate. The above radical initiators can be used alone or in combination of at least two of them.

The temperature at which the polyolefin and the unsaturated silane (I) or (II) are reacted in the presence of the compound capable of generating free radical sites in the polyolefin is generally above 120° C., usually above 140° C., and is sufficiently high to melt the polyolefin and to decompose the free radical initiator. For polypropylene, a temperature in the range 170° C. to 220° C. is usually preferred. The peroxide or other compound capable of generating free radical sites in the polyolefin preferably has a decomposition temperature in a range between 120-220° C., most preferably between 160-190° C.

The compound capable of generating free radical sites in the polyolefin is generally present in an amount of at least 0.01% by weight of the total composition and can be present in an amount of up to 5 or 10%. An organic peroxide, for example, is preferably present at 0.01 to 2% by weight based on the polyolefin during the grafting reaction. Most preferably, the organic peroxide is present at 0.01% to 0.5% by weight of the total composition.

The means for generating free radical sites in the polyolefin can alternatively be an electron beam. If electron beam is used, there is no need for a compound such as a peroxide capable of generating free radicals. The polyolefin is irradiated with an electron beam having an energy of at least 5 MeV in the presence of the unsaturated silane (I) or (II). Preferably, the accelerating potential or energy of the electron beam is between 5 MeV and 100 MeV, more preferably from 10 to 25 MeV. The power of the electron beam generator is preferably from 50 to 500 kW, more preferably from 120 to 250 kW. The radiation dose to which the polyolefin/grafting agent mixture is subjected is preferably from 0.5 to 10 Mrad. A mixture of polyolefin and the unsaturated silane (I) or (II) can be deposited onto a continuously moving conveyor such as an endless belt, which passes under an electron beam generator which irradiates the mixture. The conveyor speed is adjusted in order to achieve the desired irradiation dose.

The grafting reaction is preferably carried out in the presence of a co-agent which inhibits polymer degradation by beta scission in the presence of means capable of generating free radical sites in the polyolefin. Many polymers of alpha-olefins having 3 or more carbon atoms, for example polypropylene, undergo polymer degradation by chain β-scission when free radical sites are generated in the polyolefin due to the presence of a tertiary carbon. Whilst for some uses, such as increasing the adhesion performances in coatings, such degradation may not be important, in most cases it will be desired to inhibit or even minimize polymer degradation by chain β-scission, particularly where grafting is the first stage of preparing a filled polyolefin composition or crosslinked polyolefin intended to have improved mechanical properties.

The co-agent which inhibits polymer degradation is preferably a compound containing an aromatic ring conjugated with an olefinic —C=C— or acetylenic —C≡C— unsaturated bond. By an aromatic ring we mean any cyclic moiety which is unsaturated and which shows some aromatic character or π-bonding. The aromatic ring can be a carbocyclic ring such as a benzene or cyclopentadiene ring or a heterocyclic ring such as a furan, thiophene, pyrrole or pyridine ring, and can be a single ring or a fused ring system such as a naphthalene, quinoline or indole moiety. Most preferably the co-agent is a vinyl or acetylenic aromatic compound such as styrene, alpha-methylstyrene, beta-methyl styrene, vinyltoluene, vinyl-pyridine, 2,4-biphenyl-4-methyl-1-pentene, phenylacetylene, 2,4-di(3-isopropylphenyl)-4-methyl-1-pentene, 2,4-di(4-isopropylphenyl)-4-methyl-1-pentene, 2,4-di(3-methylphenyl)-4-methyl-1-pentene, 2,4-di(4-methylphenyl)-4-methyl-1-pentene, and may contain more than one vinyl group, for example divinylbenzene, o-, m- or p-diisopropenylbenzene, 1,2,4- or 1,3,5-triisopropenylbenzene, 5-isopropyl-m-diisopropenylbenzene, 2-isopropyl-p-diisopropenylbenzene, and may contain more than one aromatic ring, for example trans- and cis-stilbene, 1,1-diphenylethylene, or 1,2-diphenylacetylene, diphenyl imidazole, diphenylfulvene, 1,4-diphenyl-1,3-butadiene, 1,6-diphenyl-1,3,5-hexatriene, dicinnamalacetone, phenylindenone. The co-agent can alternatively be a furan derivative such as 2-vinylfuran. A preferred co-agent is styrene.

The co-agent which inhibits polymer degradation can alternatively be a compound containing an olefinic —C=C— or acetylenic —C≡C— conjugated with an olefinic —C=C— or acetylenic —C≡C— unsaturated bond. For example a sorbate ester, or a 2,4-pentadienoates, or a cyclic derivative thereof. A preferred co agent is ethyl sorbate of the formula:

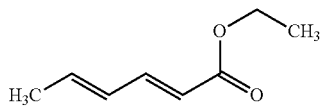

The co-agent which inhibits polymer degradation can alternatively be multi-functional acrylate, such as e.g., trimethylolpropane triacrylate, pentaerythritol tetraacrylate, pentaerythriol triacrylate, diethyleneglycol diacrylate, dipropylenglycol diacrylate. or ethylene glycol dimethacrylate, or lauryl and stearylacrylates.

The co-agent which inhibits polymer degradation is preferably added with the unsaturated silane and the compound such as a peroxide capable of generating free radical sites in the polyolefin. The co-agent, for example a vinyl aromatic compound such as styrene, is preferably present at 0.1 to 15.0% by weight of the total composition.

The grafting reaction between the polyolefin and the unsaturated silane (I) or (II) can be carried out as a batch process or as a continuous process using any suitable apparatus. The polyolefin can for example be added in pellet or powder form or a mixture thereof. The polyolefin is preferably subjected to mechanical working while it is heated. A batch process can for example be carried out in an internal mixer such as a Brabender Plastograph (Trade Mark) 350S mixer equipped with roller blades, or a Banbury mixer. A roll mill can be used for either batch or continuous processing. In a batch process, the polyolefin, the unsaturated silane, the co-agent which inhibits polymer degradation and the compound capable of generating free radical sites in the polyolefin are generally mixed together at a temperature above the melting point of the polyolefin for at least 1 minute and can be mixed for up to 30 minutes, although the time of mixing at high temperature is generally 3 to 15 minutes. The unsaturated silane, the co-agent and the peroxide can be added sequentially although it is preferred to add the peroxide together with the silane and the co-agent. The high temperature mixing is carried out at a temperature which is between the melt temperature and the degradation temperature of the polyolefin used. This is generally above 120° C. For polypropylene the mixing temperature is preferably above 170° C. The reaction mixture can be held at a temperature above 140° C. for a further period of for example 1 to 20 minutes after mixing to allow the grafting reaction to continue.

Continuous processing is generally preferred, and the preferred vessel is an extruder adapted to mechanically work, that is to knead or compound, the materials passing through it, for example a twin screw extruder. One example of a suitable extruder is that sold under the trade mark ZSK from Coperion Werner Pfleiderer GmbH & Co KG. The extruder preferably includes a vacuum port shortly before the extrusion die to remove any unreacted silane. The residence time of the polyolefin, the unsaturated silane, the co-agent which inhibits polymer degradation and the compound capable of generating free radical sites in the polyolefin together at above 120° C. in the extruder or other continuous reactor is generally at least 0.5 minutes and preferably at least 1 minute and can be up to 15 minutes. More preferably the residence time is 1 to 5 minutes. All or part of the polyolefin may be premixed with the unsaturated silane and/or the compound capable of generating free radical sites in the polyolefin before being fed to the extruder, but such premixing is generally at below 120° C., for example at ambient temperature.

The hydrolysable groups, for example silyl-alkoxy groups, present in the silane moieties grafted to the polyolefin react in the presence of moisture with hydroxyl groups present on the surface of many fillers and substrates, for example of minerals and natural products. The moisture can be ambient moisture or a hydrated salt can be added. Grafting of the polyolefin with an unsaturated silane according to the invention can be used to improve compatibility of the polyolefin with fillers. The polyolefin grafted with hydrolysable groups can be used as a coupling agent improving filler/polymer adhesion; for example polypropylene grafted according to the invention can be used as a coupling agent for unmodified polypropylene in filled compositions. The polyolefin grafted with hydrolysable groups can be used as an adhesion promoter or adhesion interlayer improving the adhesion of a low polarity polymer such as polypropylene to surfaces. The hydrolysable groups can also react with each other in the presence of moisture to form Si—O—Si linkages between polymer chains. The polyolefin grafted with hydrolysable groups can be foamed by reaction with moisture in the presence of a blowing agent.

The hydrolysable groups, for example silyl-alkoxy groups, react with each other in the presence of moisture to form Si—O—Si linkages between polymer chains even at ambient temperature, without catalyst, but the reaction proceeds much more rapidly in the presence of a siloxane condensation catalyst. Thus the grafted polymer can be crosslinked by exposure to moisture in the presence of a silanol condensation catalyst. The grafted polymer can be foamed by adding a blowing agent, moisture and condensation catalyst. Any suitable condensation catalyst may be utilised. These include protic acids, Lewis acids, organic and inorganic bases, transition metal compounds, metal salts and organometallic complexes.

Preferred catalysts include organic tin compounds, particularly organotin salts and especially diorganotin dicarboxylate compounds such as dibutyltin dilaurate, dioctyltin dilaurate, dimethyltin dibutyrate, dibutyltin dimethoxide, dibutyltin diacetate, dimethyltin bisneodecanoate, dibutyltin dibenzoate, dimethyltin dineodeconoate or dibutyltin dioctoate. Alternative organic tin catalysts include triethyltin tartrate, stannous octoate, tin oleate, tin naphthate, butyltintri-2-ethylhexoate, tin butyrate, carbomethoxyphenyl tin trisuberate and isobutyltin triceroate. Organic compounds, particularly carboxylates, of other metals such as lead, antimony, iron, cadmium, barium, manganese, zinc, chromium, cobalt, nickel, aluminium, gallium or germanium can alternatively be used.

The condensation catalyst can alternatively be a compound of a transition metal selected from titanium, zirconium and hafnium, for example titanium alkoxides, otherwise known as titanate esters of the general formula $Ti[OR^5]_4$ and/or zirconate esters $Zr[OR^5]_4$ where each $R^5$ may be the same or different and represents a monovalent, primary, secondary or tertiary aliphatic hydrocarbon group which may be linear or branched containing from 1 to 10 carbon atoms. Preferred examples of $R^5$ include isopropyl, tertiary butyl and a branched secondary alkyl group such as 2,4-dimethyl-3-pentyl. Alternatively, the titanate may be chelated with any suitable chelating agent such as acetylacetone or methyl or ethyl acetoacetate, for example diisopropyl bis(acetylacetonyl)titanate or diisopropyl bis(ethylacetoacetyl)titanate.

The condensation catalyst can alternatively be a protonic acid catalyst or a Lewis acid catalyst. Examples of suitable protonic acid catalysts include carboxylic acids such as acetic acid and sulphonic acids, particularly aryl sulphonic acids such as dodecylbenzenesulphonic acid. A "Lewis acid" is any substance that will take up an electron pair to form a covalent bond, for example, boron trifluoride, boron trifluoride monoethylamine complex, boron trifluoride methanol complex, $FeCl_3$, $AlCl_3$, $ZnCl_2$, $ZnBr_2$ or catalysts of formula $MR^4_fX_g$ where M is B, Al, Ga, In or Tl, each $R^4$ is independently the same or different and represents a monovalent aromatic hydrocarbon radical having from 6 to 14 carbon atoms, such monovalent aromatic hydrocarbon radicals preferably having at least one electron-withdrawing element or group such as —CF3, —NO2 or —CN, or substituted with at least two halogen atoms; X is a halogen atom; f is 1, 2, or 3; and g is 0, 1 or 2; with the proviso that f+g=3. One example of such a catalyst is $B(C_6F_5)_3$.

An example of a base catalyst is an amine or a quaternary ammonium compound such as tetramethylammonium hydroxide, or an aminosilane. Amine catalysts such as laurylamine can be used alone or can be used in conjunction with another catalyst such as a tin carboxylate or organotin carboxylate.

The silane condensation catalyst is typically used at 0.005 to 1.0 by weight of the total composition. For example a diorganotin dicarboxylate is preferably used at 0.01 to 0.1% by weight of the total composition.

The grafted polyolefin can contain one or more organic or inorganic fillers and/or fibers. According to one aspect of the invention grafting of the polyolefin can be used to improve compatibility of the polyolefin with fillers and fibrous reinforcements. Improved compatibility of a polyolefin such as polypropylene with fillers or fibers can give filled polymer compositions having improved properties whether or not the grafted polyolefin is subsequently crosslinked optionally using a silanol condensation catalyst. Such improved properties can for example be improved physical properties derived from reinforcing fillers or fibres, or other properties derived from the filler such as improved coloration by pigments. The fillers and/or fibres can conveniently be mixed into the polyolefin with the unsaturated silane and the organic peroxide during the grafting reaction, or can be mixed with the grafted polymer subsequently.

When forming a filled polymer composition, the grafted polymer can be the only polymer in the composition or can be used as a coupling agent in a filled polymer composition also comprising a low polarity polymer such as an unmodified polyolefin. The grafted polymer can thus be from 1 or 10% by weight up to 100% of the polymer content of the filled composition. Moisture and optionally silanol condensation catalyst can be added to the composition to promote bonding between filler and silane grafted polymer. Preferably the grafted polymer can be from 2% up to 10% of the total weight of the filled polymer composition.

In one embodiment, treating the filler and grafting to the PP resin polymer are done in situ, in one step. The ingredients (silane, peroxide, co-agents) can be added altogether or separately in the reaction vessel.

In an alternative process, the filler can be first treated with (I) or (II) and then added to a polyolefin matrix. The silane at the surface of the filler will then react with the polyolefin matrix when free radical sites are generated in the polyolefin. Some free radical sites are generated when the polyolefin is subjected to high shear at high temperature, for example when the polyolefin is processed in a twin screw extruder, and this may be sufficient to enhance the bonding between the filler and the polyolefin. Free radical sites can also be generated by electron beam. Free radical sites can also be generated by adding a peroxide, optionally with a co-agent which inhibits polymer degradation by beta scission, and processing at elevated temperature.

Examples of mineral fillers or pigments which can be incorporated in the grafted polymer include titanium dioxide, aluminium trihydroxide, magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite. Examples of fibres include natural fibres such as wood flour, wood fibers, cotton fibres, cellulosic fibres or agricultural fibres such as wheat straw, hemp, flax, kenaf, kapok, jute, ramie, sisal, henequen, corn fibre or coir, or nut shells or rice hulls, or synthetic fibres such as polyester fibres, aramid fibers, nylon fibers, or glass fibers. Examples of organic fillers include lignin, starch or cellulose and cellulose-containing products, or plastic microspheres of polytetrafluoroethylene or polyethylene. The filler can be a solid organic pigment such as those incorporating azo, indigoid, triphenylmethane, anthraquinone, hydroquinone or xanthine dyes.

The concentration of filler or pigment in such filled compositions can vary widely; for example the filler or pigment can form from 1 or 2% up to 70% by weight of the total composition.

The grafted polyolefin of the invention can also be used to improve the compatibility of a low polarity polymer such as polypropylene with a polar polymer. The composition comprising the low polarity polymer, polar polymer and grafted polyolefin can be filled and/or fibre-reinforced or unfilled.

The grafted polyolefin of the present invention can also be used for increasing the surface energy of polyolefins for further improving the coupling or adhesion of polyolefin based materials with higher surface energy polymers typically used in inks, paints, adhesives and coatings, e.g., epoxy, polyurethanes, acrylics and silicones.

When forming a crosslinked polyolefin article, the grafted polymer is preferably shaped into an article and subsequently crosslinked by moisture. In one preferred procedure, a silanol condensation catalyst can be dissolved in the water used to crosslink the grafted polymer. For example an article shaped from grafted polyolefin can be cured by water containing a carboxylic acid catalyst such as acetic acid, or containing any other common catalyst capable of accelerating the hydrolysis and condensation reactions of alkoxy-silyl groups. However, crosslinking may also take place in absence of such catalyst.

Alternatively or additionally, the silanol condensation catalyst can be incorporated into the grafted polymer before the grafted polymer is shaped into an article. The shaped article can subsequently be crosslinked by moisture. The catalyst can be mixed with the polyolefin before, during or after the grafting reaction.

In one preferred procedure, the polyolefin, the unsaturated silane, the compound capable of generating free radical sites in the polyolefin and the vinyl aromatic co-agent are mixed together at above 120° C. in a twin screw extruder to graft the silane to the polymer, and the resulting grafted polymer is mixed with the silanol condensation catalyst in a subsequent mixing step. Mixing with the catalyst can for example be carried out continuously in an extruder, which can be an extruder adapted to knead or compound the materials passing through it such as a twin screw extruder as described above or can be a more simple extruder such as a single screw extruder. Since the grafted polymer is heated in such a second extruder to a temperature above the melting point of the polyolefin, the grafting reaction may continue in the second extruder.

In an alternative preferred procedure, the silanol condensation catalyst can be premixed with part of the polyolefin and the unsaturated silane (I) or (II) can be premixed with a different portion of the polyolefin, and the two premixes can be contacted, optionally with further polyolefin, in the mixer or extruder used to carry out the grafting reaction. Since most unsaturated silanes and the preferred condensation catalysts such as diorganotin dicarboxylates are liquids, it may be preferred to absorb each of them separately on a microporous polyolefin before mixing with the bulk of the polypropylene or other polyolefin in an extruder.

In other preferred embodiments, crosslinking is made in the absence of silanol condensation catalyst. This is advantageous as it permits to decrease the number of reactants needed, cost and risk of pollution linked to the use of silanol condensation catalyst especially those based on tin. U.S. Pat. No. 7,015,297 provide alkoxysilane-terminated polymer systems which on curing not only crosslink, but also bring about chain extension of the polymers. It is said that by incorporating dialkoxy alpha-silanes, the reactivity of such compositions is also sufficiently high that it is possible to produce compositions without the use of relatively large amounts of catalysts which generally contain tin. US20050119436 reports that EP 372 561 A describes the preparation of a silane-crosslinkable polyether which has to be stored with exclusion of moisture, since it vulcanizes with or without silane condensation catalysts. It was observed that in process according to the present invention, α-ATM does not require the use of a condensation catalyst (e.g., DOTDL) for achieving complete crosslinking in the material. On the other hand, addition of a condensation catalyst permits to use less reactive unsaturated silane with same speed of polymer cross-linking as when using more reactive unsaturated silane without condensation catalyst.

Fillers and/or reinforcing fibres can be incorporated into the polymer composition with the silanol condensation catalyst if this is added to the grafted polyolefin in a separate subsequent step when forming a crosslinked polymer.

Whatever the mixing procedure used for adding the catalyst to the grafted polymer, care should be taken when forming a crosslinked polymer article to avoid exposure of the silane and catalyst together to moisture, or of the composition of silane-grafted polymer and catalyst to moisture, before its final shaping into the desired article.

On the other hand, when producing a foam article from a grafted polyolefin according to the invention the hydrolysis and condensation reaction preferably takes place directly on mixing with the silanol condensation catalyst. This ensures a higher melt strength of the polymer in the foamed article. The polyolefin grafted with hydrolysable groups is preferably foamed by adding a blowing agent, moisture and condensation catalyst together to the grafted polyolefin composition. The blowing agent can be a chemical blowing agent generating gas by decomposition, for example azodicarbonamide, or a physical blowing agent which is a vapour or a gas injected under pressure which expands when the composition is released to atmospheric pressure.

For many uses the grafted or crosslinked polymer preferably contains at least one antioxidant. Examples of suitable antioxidants include tris(2,4-di-tert-butylphenyl)phosphite sold commercially under the trade mark Ciba Irgafos®168, tetrakis [methylene-3-(3,5-di-tert-butyl-4-hydroxyphenyl-propionate)] methane processing stabilizer sold commercially under the trade mark Ciba Irganox®1010 and 1,3,5-trimethyl-2,4,6-tris(3,5-di-tert-butyl-4-hydroxy benzyl) benzene sold commercially under the trade mark Ciba Irganox®1330. It may also be desired that the crosslinked polymer contains a stabiliser against ultraviolet radiation and light radiation, for example a hindered amine light stabiliser such as a 4-substituted-1,2,2,6,6-pentamethylpiperidine, for example those sold under the trade marks Tinuvin 770, Tinuvin 622, Uvasil 299, Chimassorb 944 and Chimassorb 119. The antioxidant and/or hindered amine light stabiliser can conveniently be incorporated in the polyolefin either with the unsaturated silane and the organic peroxide during the grafting reaction or with the silanol condensation catalyst if this is added to the grafted polymer in a separate subsequent step. The total concentration of antioxidants and light stabilisers in the crosslinked polyolefin is typically in the range 0.02 to 0.15% by weight of the total composition.

The grafted or crosslinked polymer of the invention can also contain other additives such as dyes or processing aids.

The polymer compositions of the invention, particularly filled grafted polyolefin compositions and/or crosslinked polyolefins, can be used in a wide variety of products. The grafted polymer can be blow moulded or rotomoulded to form bottles, cans or other liquid containers, liquid feeding parts, air ducting parts, tanks, including fuel tanks, corrugated bellows, covers, cases, tubes, pipes, pipe connectors or transport trunks. The grafted polymer can be blow extruded to form pipes, corrugated pipes, sheets, fibers, plates, coatings, film, including shrink wrap film, profiles, flooring, tubes, conduits or sleeves or extruded onto wire or cable as an electrical insulation layer. The grafted polymer can be injection moulded to form tube and pipe connectors, packaging, gaskets and panels. The grafted polymer can also be foamed or thermoformed. In each case the shaped article can be crosslinked by exposure to moisture in the presence of a silanol condensation catalyst.

Crosslinked polyolefin articles produced according to the invention have improved mechanical strength, melt strength, heat resistance, chemical and oil resistance, creep resistance and/or environmental stress cracking resistance compared to articles formed from the same polyolefin without grafting or crosslinking.

The invention is illustrated by the following Examples.

RAW MATERIALS

The polymers used were
PP=Isotactic polypropylene homopolymer supplied as Borealis® HB 205 TF (melt flow index MFR 1 g/10 min at 230° C./2.16 kg measured according to ISO 1133);
PPH=Polypropylene homopolymer sold by Total Petrochemicals® as PPH 7060 (MFR 12 g/10 min, 230° C./2.16 kg);
PPC=Polypropylene copolymer sold by Total Petrochemicals® as PPC 7760 (MFR 12 g/10 min, 230° C./2.16 kg);
PP powder=Polypropylene homopolymer sold by Basell® as Moplen HF500N (MFR 12 g/10 min, 230° C./2.16 kg);
RTP100=Polypropylene RTP 100 (MFR 4 g/10 min, 230° C./2.16 kg) from RTP Company®;
Porous PP was microporous polypropylene supplied by Membrana as Accurel® XP100. This microporous polypropylene was used for absorbing liquid ingredients. Characteristics of Accurel®XP100 are MFR (2.16 kg/230° C.) 2.1 g/10 min (method ISO1133), and melting temperature (DSC) 156° C.

The peroxides used were:
DHBP was 2,5-dimethyl-2,5-di-(tert-butylperoxy)hex-aneperoxide supplied as Arkema Luperox® 101 peroxide;
DCP was Dicumyl peroxide supplied as Arkema Luperox® DC40P;

The series of tested silanes are:
Vinyltrimethoxysilane (VTM) was Dow Corning® Z6300;
γ-methacryloxypropyltrimethoxysilane (γ-MTM) was Dow Corning® Z6030;
γ-Acryloxypropyltrimethoxysilane (γ-ATM) was prepared from allyl acrylate and trimethoxysilane by the process described in U.S. Pat. No. 3,179,612.
Acryloxymethyltrimethoxysilane (α-ATM) was prepared from acrylic acid and chloromethyltrimethoxysilane by the process described in U.S. Pat. No. 3,179,612.
Styryl-silane=Styrylethyltrimethoxysilane ≥92%, inhibited with t-butylcatechol, supplied by ABCR® (ref. AB111376);
Siloxybutadiene-silane=1-(Trimethylsiloxy)-1,3-butadiene supplied by ABCR® (ref. AB111504).

Two antioxidants were used:
Irgafos 168 was tris-(2,4-di-tert-butylphenyl)phosphite antioxidant supplied by Ciba as Irgafos®168
Irganox 1010 was tetrakis [methylene-3-(3,5-di-tert-butyl-4-hydroxyphenyl-propionate)] methane phenolic antioxidant supplied by Ciba as Irganox®1010.

Condensation catalyst used were:
1% acetic acid diluted into water for curing molded or injected specimens underwater;
Dioctyltindilaurate (DOTDL) supplied by ABCR® (ref. AB106609), diluted into Naphthenic processing oil Nyflex® 222B sold by Nynas with a viscosity of 104 cSt (40° C., method ASTM D445) and specific gravity 0.892 g/cm3 (method ASTM D4052) for compounding into the composite material The co-agents used for inhibiting polymer degradation were
Styrene ≥99% supplied by Sigma-Aldrich Reagent Plus® (ref. S4972);
Alpha-methylstyrene ≥99% supplied by Sigma-Aldrich Reagent Plus® (ref. M80903);
Divinylbenzene, technical grade, mixture of isomers, ≥80% supplied by Sigma-Aldrich Reagent Plus® (ref. 414565);
Phenylacetylene ≥97% supplied by Sigma-Aldrich Reagent Plus® (ref. 77840);
Diphenylacetylene ≥98% supplied by Sigma-Aldrich Reagent Plus® (ref. D204803);
Trimethylolpropane triacrylate, supplied by Cray Valley (ref. SARTOMER 351);
Ethyl sorbate ≥98% supplied by Sigma-Aldrich Reagent Plus® (ref. 177687);
Methyl-2,4-pentadienoate ≥97% supplied by Sigma-Aldrich Reagent Plus® (ref. 18888).

The fillers used were:
Wood Flour=F530/200 ligno-cellulosic additive sold by S.P.P.S.®
Fiber Glass=CARTEC PLUS DS 2100-13P, chopped strand fibers of diameter 13.0 μm and length 4.0 mm from 3B® company
Talc=Talc PR8218 sold by Luzenac®
The reference coupling agent used was:
MAg-PP=Orevac® CA 100, maleic anhydride grafted polypropylene (MFR 150-200 g/10 min, 230° C./2.16 kg) sold by Arkema®.

Example 1

10 parts by weight porous PP pellets were tumbled with 9.7 parts by weight γ-acryloxypropyltrimethoxysilane and 0.2 parts DHBP until the liquid reagents were absorbed by the polypropylene to form a silane masterbatch.

100 parts by weight Borealis® HB 205 TF polypropylene pellets were loaded in a Brabender® Plastograph 350E mixer equipped with roller blades, in which compounding was carried out. Mixer filling ratio was 0.7. Rotation speed was 50 rpm, and the temperature of the chamber was maintained at 190° C. Torque and temperature of the melt were monitored for controlling the reactive processing of the ingredients. The PP was loaded in three portions allowing 1 minute fusion/mixing after each addition. The silane masterbatch was then added and mixed for 4 minutes to start the grafting reaction. The antioxidants were then added and mixed for a further 1 minute during which grafting continued. The melt was then dropped from the mixer and cooled down to ambient temperature. The resulting grafted polypropylene was molded into 2 mm thick sheet on an Agila® PE30 press at 210° C. for 5 minutes before cooling down to ambient temperature at 15° C./min with further pressing.

Samples of the 2 mm sheet were cured at 90° C. for 24 hours in a water bath containing 1% acetic acid as a catalyst.

The torque during compounding and the elastic shear modulus G' of the crosslinked polypropylene after 24 hours curing were measured. These are recorded in Table 1.

The processing torque is the measure of the torque in Newton*meter (N·m) applied by the motor of the Plastograph 350E mixer to maintain the mixing speed of 50 rpm. The torque value reported is the plateau level at the end of the mixing step.

The lower the torque, the lower the polymer viscosity. The torque level at the end of mixing stage is therefore an image of polymer degradation during mixing.

Elastic shear modulus (G') measurements were carried out on the Advanced Polymer Analyzer APA2000® supplied by Alpha technologies. 3.5 g specimens were analyzed above their melting point, at temperature of 180° C. Elastic shear modulus (G') was recorded upon strain sweep under constant oscillating conditions (0.5 Hz). Recording the elastic shear modulus (G'), viscous modulus (G"), and TanD on a range of strain from 1 to 610% takes approximately 8 minutes. From the various plots of G' as a function of percentage strain, the values at 12% strain were all in the linear viscoelastic region. The G'@12% strain value was therefore selected in order to follow the increase in elastic shear modulus as a function of time curing of the specimens described in the Examples.

The gel content of the polypropylene sheet after 24 hours curing was measured and recorded in Table 1. Gel content was determined using method ISO 10147 "Pipes and fittings made of crosslinked polyethylene (PE-X)—Estimation of the degree of crosslinking by determination of the gel content". The principle of the test consists in measuring the mass of a test piece taken from a molded part before and after immersion of the test piece in a solvent (e.g. 8 hours in refluxing xylene). The degree of crosslinking is expressed as the mass percentage of the insoluble material.

Comparative Examples C1 to C3

In Comparative Example C1, Example 1 was repeated with the omission of the acryloxypropylsilane. In Comparative Example C2, Example 1 was repeated with the omission of the acryloxypropylsilane and the peroxide. Example 1 was repeated replacing the γ-acryloxypropyltrimethoxysilane by an equimolar amount of vinyltrimethoxysilane in Comparative Example C3. The torque during compounding, the elastic shear modulus G' and gel content of the polypropylene after 24 hours curing were measured and are recorded in Table 1.

TABLE 1

| | Example 1 | Comparative Example C1 | Comparative Example C2 | Comparative Example C3 |
|---|---|---|---|---|
| PP | 100 | 100 | 100 | 100 |
| Porous PP | 10 | 10 | 10 | 10 |
| DHBP | 0.2 | 0.2 | — | 0.2 |
| Irganox 1010 | 0.5 | 0.5 | 0.5 | 0.5 |
| Irgafos 168 | 0.5 | 0.5 | 0.5 | 0.5 |
| γ-ATM | 9.7 | — | — | — |
| VTM | — | — | — | 6 |
| Torque (Nm) | 26 | 15 | 77 | 12 |
| G'@12% strain (After Curing) (kPa) | 16 | 2 | 20 | 5 |
| Gel Content (%) | 79 | 0 | 0 | 1 |

The torque values in Table 1 show that peroxide alone (Comparative Example C1) generates much degradation of the polypropylene. γ-ATM (Example 1) inhibits this degradation to some extent, whereas VTM does not (Comparative Example C3).

From the gel content results in Table 1 we can conclude that the polymer of Example 1 has cured to a high crosslink density, since the gel content is much higher than that of the references PP in Comparative Examples C1 and C2. By contrast, Example C3 using vinyltrimethoxysilane does not show any significant crosslinking.

Examples 2 to 4

Example 1 was repeated using different amounts of styrene as shown in Table 2 below. The styrene was added to the porous PP with the unsaturated silane. In Example 2, γ-ATM and styrene were used in equimolar amounts.

Comparative Examples C4 to C6

In Comparative Example C4, Example 2 was repeated with the omission of the acryloxypropyltrimethoxysilane (γ-ATM). In Comparative Examples C5 and C6, the γ-ATM was replaced by an equimolar amount of vinyltrimethoxysilane (VTM) in Comparative Example C5 and by an equimolar amount of γ-methacryloxypropyltrimethoxysilane (γ-MTM) in Comparative Example C6.

For each of Examples 2 to 4 and Comparative Examples C4 to C6, the torque during compounding and the elastic shear modulus G' of the polypropylene after 24 hours curing and gel content after 24 hours curing were measured and are recorded in Table 2.

TABLE 2

|  | Example 2 | Example 3 | Example 4 | Comparative Example C4 | Comparative Example C5 | Comparative Example C6 |
|---|---|---|---|---|---|---|
| PP | 100 | 100 | 100 | 100 | 100 | 100 |
| Porous PP | 10 | 10 | 10 | 10 | 10 | 10 |
| DHBP | 0.2 | 0.2 | 0.2 | 0.2 | 0.2 | 0.2 |
| Irganox 1010 | 0.5 | 0.5 | 0.5 | 0.5 | 0.5 | 0.5 |
| Irgafos 168 | 0.5 | 0.5 | 0.5 | 0.5 | 0.5 | 0.5 |
| γ-ATM | 9.7 | 9.7 | 9.7 | — | — | — |
| VTM | — | — | — | — | 6.0 | — |
| γ-MTM | — | — | — | — | — | 10.4 |
| Styrene | 4.3 | 2.2 | 6.5 | 4.2 | 4.2 | 4.3 |
| Torque (Nm) | 53 | 43 | 57 | 46 | 45 | 52 |
| G' @ 12% strain (After Curing) (kPa) | 46 | 44 | 47 | 12 | 14 | 33 |
| Gel content (%) | 65 | 94 | 93 | 2 | 1 | 59 |

A comparison of the torque values in Tables 1 and 2 shows that peroxide alone (Comparative Example C1) generates much degradation of the polypropylene, and that styrene (Comparative Example C4) inhibits this degradation significantly. γ-ATM (Example 1) also inhibits degradation but to a lesser extent.

From the G' values in Table 2 we can conclude that the polymers of Examples 2 to 4 have cured to a high crosslink density, since G' @12% strain is much higher than that of the reference PP in Comparative Example C2. This can not be achieved with styrene alone, as shown by Comparative Example C4. The polymers of Examples 2 to 4 using γ-acryloxypropyltrimethoxysilane have cured to a higher crosslink density than achieved in Example C6 using γ-methacryloxypropyltrimethoxysilane, whilst Example C5 using vinyltrimethoxysilane does not show any significant crosslinking.

The gel content results confirm those from G' @12% strain. The polypropylene of Example 2 using γ-acryloxypropyltrimethoxysilane shows a higher gel content than achieved in Example C6 using γ-methacryloxypropyltrimethoxysilane, whilst Example C5 using vinyltrimethoxysilane shows almost no gel formation.

Examples 5 to 8

Following the procedure of Example 1, polypropylene was grafted with various amounts of γ-ATM as shown in Table 3 in the presence of dicumyl peroxide and styrene and was crosslinked. The molar ratio of styrene to γ-ATM was kept at 1.5:1. The torque, the elastic shear modulus G' after curing and gel content after curing were measured and are recorded in Table 3.

Comparative Examples C7 to C10

Examples 5 to 8 were repeated replacing the γ-ATM in each case by an equimolar amount of γ-MTM. The results are recorded in Table 3.

TABLE 3

|  | Example 5 | Example 6 | Example 7 | Example 8 | Comparative Example C7 | Comparative Example C8 | Comparative Example C9 | Comparative Example C10 |
|---|---|---|---|---|---|---|---|---|
| PP | 100 | 100 | 100 | 100 | 100 | 100 | 100 | 100 |
| Porous PP | 10 | 10 | 10 | 10 | 10 | 10 | 10 | 10 |
| DCP | 0.5 | 0.5 | 0.5 | 0.5 | 0.5 | 0.5 | 0.5 | 0.5 |
| Irganox 1010 | 0.5 | 0.5 | 0.5 | 0.5 | 0.5 | 0.5 | 0.5 | 0.5 |
| Irgafos 168 | 0.5 | 0.5 | 0.5 | 0.5 | 0.5 | 0.5 | 0.5 | 0.5 |
| γ-ATM | 1.1 | 2.2 | 3.3 | 5.7 | — | — | — | — |
| γ-MTM | — | — | — | — | 1.1 | 2.3 | 3.5 | 6.1 |
| Styrene | 0.7 | 1.4 | 2.2 | 3.8 | 0.7 | 1.5 | 2.2 | 3.8 |
| Torque (Nm) | 42 | 50 | 51 | 55 | 43 | 45 | 47 | 51 |
| G' @12% strain (After Curing) (kPa) | 20 | 24 | 33 | 33 | 14 | 17 | 22 | 26 |
| Gel Content (%) | 67 | 82 | 88 | 80 | 0 | 14 | 51 | 73 |

The torque results in Table 3 show that the torque slightly increases with increasing amounts of silane and styrene. We believe that styrene prevents polypropylene degradation by beta-scission significantly, and the increasing amount of styrene in the two sets of Examples (Examples 5 to 8 and Comparative Examples C7 to C10) in Table 3 is the main contribution to increasing torque.

The results for G'@12% strain in Table 3 indicate that crosslink density of the cured grafted polypropylene increases with silane content for both γ-ATM and γ-MTM, at least at the lower levels of silane. The gel content results in Table 3 confirm this. The crosslinking density is always higher with γ-ATM than with γ-MTM used at the same level, indicating the increased grafting efficiency with γ-ATM and illustrating the clear benefit of γ-ATM over γ-MTM. With γ-ATM, no further crosslinking increase is observed beyond 3% by weight γ-ATM, and it may be that no extra benefit is gained by using γ-ATM at above this level.

Example 9

Scaling up of the batch process described in Example 2 above to continuous process was carried out on a Brabender® DSE 20/40 co-rotating twin screw extruder having screw diameter of 20 mm and L/D=40. Screws rotation speed was 250 rpm and temperature profile of the 6 heating zones was the following:
T1=190° C.;
T2=190° C.;
T3=195° C.;
T4=195° C.;
T5=195° C.;
T6=200° C.

Raw materials were all fed via barrel opening at 0 D, using gravimetric feeders Brabender Technologie® DSR28. Liquids were first adsorbed onto Accurel® XP100 porous polypropylene to allow feeding and a masterbatch of the powdery anti-oxidants into polypropylene base resin has been preliminarily prepared. Atmospheric venting was performed through barrel opening at 30 D. Total extrusion throughput was 3.5 kg/h. The resulting grafted polypropylene product was then shaped into a 2 mm thick sheet on an Agila® PE 30 press at 210° C. for 5 minutes before cooling down to ambient temperature at 15° C./min with further pressing.

Samples of the 2 mm sheet were cured at 90° C. for 24 hours in a water bath containing 1% acetic acid as a catalyst.

The elastic shear modulus G' of the grafted polypropylene were measured. The elastic shear modulus G' was measured before curing and also after 24 hours curing. These are recorded in Table 4.

Comparative Examples C11 and C12

Polypropylene containing no peroxide, γ-ATM or styrene (Comparative Example C11) and polypropylene containing peroxide but no γ-ATM or styrene (Comparative Example C12) were extruded and treated with aqueous acetic acid as described in Example 9. The results are shown in Table 4

TABLE 4

| | Comparative Example C11 | Comparative Example C12 | Example 9 |
|---|---|---|---|
| PP | 100 | 100 | 100 |
| Porous PP | 10 | 10 | 10 |
| DHBP | — | 0.2 | 0.2 |

TABLE 4-continued

| | Comparative Example C11 | Comparative Example C12 | Example 9 |
|---|---|---|---|
| Irganox 1010 | 0.5 | 0.5 | 0.5 |
| Irgafos 168 | 0.5 | 0.5 | 0.5 |
| γ-ATM | — | — | 9.7 |
| Styrene | — | — | 4.3 |
| G'@12% strain before cure [kPa] | 25 | 10 | 16 |
| G' @ 12% strain After Cure [kPa] | 25 | 10 | 47 |
| % gel content | | 2 | 86 |

From the results of Example 9 it can be seen that the process of the invention can successfully be carried out continuously in a twin screw extruder. Comparison of the values for G' @ 12% strain after cure and for gel content for Example 9 in Table 4 with the values shown in Table 2 for Example 2 show that an even higher crosslink density (indicating a higher level of grafting) was achieved in the continuous process.

Adhesion of the grafted polypropylene of Example 9 was evaluated using single-lap-joint specimens made of silicone sealants applied onto polypropylene compounds used as a substrate. Adhesion to two different silicone sealants were considered. The adhesion is determined by measuring the amount of pull required to separate lap-shear specimens (Tensile strength in MPa). Also, the amount of adhesive or cohesive failure of each joint is estimated [%]. The grafted polypropylene was tested without acetic acid curing. The extruded polypropylene of Comparative Example C11 was tested as a comparison both neat and after plasma treatment. Joint size was width 18 mm, height 15 mm and thickness 2 mm. Single-lap-joint specimens were cured at ambient conditions (25° C. and 50% humidity). Curing time was 2 weeks.

The lap-shear adhesion testing conditions were pre-loading at 0.5N applied at 5.5 mm/min and then tensile testing up to break at 100 mm/min. The results are shown in Table 5.

TABLE 5

| | Comparative Example C11 | Example 9 | PP + plasma |
|---|---|---|---|
| Dow-Corning ® 993 two parts room temperature vulcanization sealant | | | |
| Tensile strength [MPa] | 0.2 | 1.9 | 1.8 |
| % cohesive failure | 0 | 100 | 100 |
| Dow-Corning ® 7091 one part room temperature vulcanization sealant | | | |
| Tensile strength [MPa] | 0.1 | 2.1 | 2.3 |
| Cohesive failure [%] | 0 | 97 | 90 |

Based on these results it is obvious that there was no adhesion of the two sealants onto the unmodified polypropylene of Comparative Example 11, indeed very low force is required to separate the assemblies and rupture is fully adhesive. On the other hand there was good adhesion to the grafted polypropylene of Example 9, as shown by the much higher force required for lap shear and about 100% cohesive failure of the sealants.

Polypropylene modified according to the invention shows adhesion as good as the one achieved after plasma treatment but without the need of this treatment.

The ability of the grafted polypropylene to act as a coupling agent for fillers was tested by using 5 weight % of the grafted polypropylene of Example 9 as a coupling additive in a wood plastic composite formulation. γATM-PP was γATM silane grafted polypropylene from Example 9, without curing step in aqueous acetic acid solution.

The extruded unmodified polypropylene (PP) of Comparative Example C11 was tested in the same manner.

Compounds were prepared according to a batch process using a Brabender® Plastograph 350E mixer equipped with roller blades. Rotation speed was 50 rpm, and initial temperature of the chamber was 190° C. Filling ratio was set to 0.8. Total mixing time was about 4 minutes before the melt was pressed into 2 mm thickness plates. The sequence of addition of the various ingredients in the mixer was as follows:

Loading PPC plus gATM-PP pellets, allowing 1.5 minute fusion/mixing after addition;
Loading anti-oxidants and wood flour and further mixing for 2 minutes
Dropping batch and cooling down to ambient temperature.
Resulting compounds were then molded into 2 mm thickness sheets on Agila®PE30 press at 190° C. for 5 minutes before cooling down to ambient temperature at 15° C./min with further pressing.

Tensile specimens according to ISO-527 type 1B were cut out of the molded sheets with a Ray-Ran® Polytest CNC cutting mill. Mechanical performances of each compound were evaluated by tensile testing of these specimens according to ISO-527. The compositions tested and results obtained are shown in Table 6. Composition is given in weight %.

TABLE 6

|  | Compound 1 | Compound 2 |
| --- | --- | --- |
| PPC | 54.3 | 54.3 |
| Irganox 1010 | 0.4 | 0.4 |
| Irgafos 168 | 0.4 | 0.4 |
| Wood Flour | 40 | 40 |
| Polymer of Comparative Example 11 | 5 | — |
| γATM-PP of Example 9 | — | 5 |
| Tensile Modulus [MPa] | 2400 | 2600 |
| Tensile strength [MPa] | 16 | 24 |
| Elongation at break [%] | 1.1 | 1.6 |

These results clearly show that when adding 5 wt. % of the grafted polypropylene as coupling agent to the formulation, mechanical performances of resulting wood plastic composition are improved. This indicates that grafting of the polypropylene according to the invention has improved the adhesion between the polypropylene and the wood flour filler.

4 mm thick multipurpose samples conforming to ISO-3167 were prepared by injection molding according to ISO-294 of the cured compounds of Example 9 and of Comparative Example 11. The 4 mm thick multipurpose samples were cured at 90° C. for 24 hours in a water bath containing 1% acetic acid as a catalyst. The heat deflection temperature (HDT) of the samples was measured according to ISO-75 method A and is recorded in Table 7.

TABLE 7

|  | Compound 1 | Compound 2 |
| --- | --- | --- |
| HDT [° C.] | 58 | 77 |

The crosslinked grafted polypropylene of Example 9 has a much higher heat deflection temperature, showing a much higher heat resistance, than the reference polypropylene of Comparative Example C11.

Examples 10 and 11

Following the procedure of Example 2, grafted and crosslinked polypropylene samples were made using other grades of polypropylene listed above according to the amounts of reagents shown in Table 8. The products were tested as described in Example 1 and the results are shown in Table 8

TABLE 8

|  | Example 10 | Example 11 |
| --- | --- | --- |
| PPH | 100 | — |
| PP powder | — | 100 |
| Porous PP | 10 | 10 |
| DHBP | 0.2 | 0.2 |
| Irganox 1010 | 0.5 | 0.5 |
| Irgafos 168 | 0.5 | 0.5 |
| γ-ATM | 3.5 | 3.5 |
| Styrene | 1.56 | 1.56 |
| Torque (Nm) | 18 | 22 |
| G' @ 12% strain After Cure [kPa] | 23 | 12 |
| % gel content | 70 | 71 |

The torque levels measured in Examples 10 and 11 are similar to the one observed when mixing pure polypropylene of MFR 12, illustrating the low degradation of polypropylene while grafting with an unsaturated silane according to the invention in the presence of styrene. The high gel contents measured in Examples 10 and 11 indicate effective crosslinking of the polypropylene.

Examples 12 and 13

Following the procedure of Example 2, grafted and crosslinked polypropylene samples were made using other co-agents as listed in the above raw materials paragraph, in place of the styrene and the amounts of reagents shown in Table 9. The products were tested as described in Example 1 and the results are shown in Table 9.

TABLE 9

|  | Example 12 | Example 13 |
| --- | --- | --- |
| PP | 100 | 100 |
| Porous PP | 10 | 10 |
| DHBP | 0.2 | 0.2 |
| Irganox 1010 | 0.5 | 0.5 |
| Irgafos 168 | 0.5 | 0.5 |
| γ-ATM | 9.7 | 9.7 |
| Alpha-methylstyrene | 4.9 |  |
| Divinylbenzene |  | 5.4 |
| Torque (Nm) | 48 | 73 |
| G' @ 12% strain After Cure [kPa] | 40 | 43 |
| % gel content | 86 | 65 |

The torque values in Table 9 show that Alpha-methylstyrene (Example 12) and Divinylbenzene (Example 13) inhibit polypropylene degradation significantly. Indeed these torque values are only slightly lower than that of the reference PP of Comparative example C2 in Table 1.

From the G' values in Table 9 we can conclude that the polymers of Examples 12 and 13 have cured to a high crosslink density, since G' @12% strain is much higher than that of the reference PP in Comparative Example C2 in Table 1. G' values are also significantly higher than Comparative Example C5 in Table 2, and similar to Examples 2 to 4 in Table 2.

The gel content results confirm those from G' @12% strain, indeed the gel contents of Examples 12 and 13 are much higher than that of the references PP in Comparative Examples C2. Gel content values are also significantly higher than Comparative Example C5 in Table 2, and similar to Examples 2 to 4 in Table 2.

Similarly to the results described in Examples 12 and 13, other co-agents were also used successfully to achieve high degree of crosslink density while inhibiting polypropylene degradation significantly. The co-agent tested include but are not limited to phenylacetylene, diphenylacetylene and trimethylolpropane triacrylate.

Examples 14 and 15

Following the procedure of Example 2, grafted and crosslinked polypropylene samples were made using lower concentration of styrene than in prior examples and ethylsorbate as co-agents and the amounts of reagents shown in Table 10. The products were tested as described in Example 1 and the results are shown in Table 10.

TABLE 10

|  | Example 14 | Example 15 |
| --- | --- | --- |
| PP | 100 | 100 |
| Porous PP | 10 | 10 |
| DHBP | 0.2 | 0.2 |
| Irganox 1010 | 0.5 | 0.5 |
| Irgafos 168 | 0.5 | 0.5 |
| γ-ATM | 3.5 | 3.5 |
| Styrene | 1.6 |  |
| Ethyl Sorbate |  | 2.1 |
| Torque (Nm) | 39 | 40 |
| G' @ 12% strain After Cure [kPa] | 41 | 31 |
| % gel content | 88 | 85 |

The torque values in Table 10 show that styrene (Example 14) inhibits polypropylene degradation significantly even using much lower amount (almost three times less) than the level used for Example 2. The torque values in Table 10 also show that Ethyl Sorbate (Example 15) is another very efficient inhibitor of polypropylene degradation. Indeed, both Examples 14 and 15 show torque values slightly lower than that of the reference PP of Comparative example C2 (Table 1) but much higher than those of Comparative examples C1 and C3 (Table 1) for which no co-agent has been used.

From the G' values in Table 10 we can conclude that the polymers of Examples 14 and 15 have cured to a high crosslink density, since G' @12% strain is much higher than that of the reference PP in Comparative Example C2 (Table 1). G' values are also significantly higher than Comparative Example C5 in Table 2, and similar to Examples 2 to 4 in Table 2.

The gel content results confirm those from G' @12% strain, indeed the gel contents of Examples 14 and 15 are much higher than that of the references PP in Comparative Examples C2 in Table 1. Gel content achieved using Ethyl Sorbate is almost as high as the one reached using Styrene. Gel content values are also significantly higher than Comparative Example C5 in Table 2, and similar to Examples 2 to 4 in Table 2.

Examples 16 and 17

Following the procedure of Example 2, grafted and crosslinked polypropylene samples were made using ethylsorbate and methyl-2,4-pentadienoate co-agents and Total Petrochemicals® PPH 7060 polypropylene in place of the Borealis® HB 205 TF polypropylene pellets and the amounts of reagents shown in Table 11. The products were tested as described in Example 1 and the results are shown in Table 11.

TABLE 11

|  | Example 16 | Example 17 |
| --- | --- | --- |
| PPH | 100 | 100 |
| Porous PP | 10 | 10 |
| DHBP | 0.2 | 0.2 |
| Irganox 1010 | 0.5 | 0.5 |
| Irgafos 168 | 0.5 | 0.5 |
| γ-ATM | 3.5 | 3.5 |
| Ethyl Sorbate | 2.1 |  |
| Methyl 2,4-pentadienoate |  | 1.7 |
| Torque (Nm) | 20 | 26 |
| G' @ 12% strain After Cure [kPa] | 12 | 14 |
| % gel content | 70 | 49 |

The torque levels measured in Examples 16 and 17 are similar to the one observed when mixing pure polypropylene of MFR 12, illustrating the low degradation of polypropylene while grafting with an unsaturated silane according to the invention in the presence of appropriate co-agent. The torque results in Table 11 confirm that Ethyl Sorbate and Methyl 2,4-pentadienoate are efficient co-agents to inhibit polypropylene degradation.

From the G' values and Gel content results in Table 11 we can conclude that although lower gel content for the polymer of Example 17 is achieved both the polymers of Examples 16 and 17 have reached a significant crosslink density.

Example 18

The crosslinked grafted polypropylene of Example 9 has a much higher heat deflection temperature, showing a much higher heat resistance, than the reference polypropylene of Comparative Example C11. Talc being often used to improve heat stability of polypropylene compounds, further heat stability evaluation of the polypropylene modified according to the invention was carried out on talc filled compounds.

Compounds were prepared according to a continuous process using a Brabender® DSE 20/40 co-rotating twin screw extruder having screw diameter of 20 mm and L/D=40. Screws rotation speed was 250 rpm and temperature profile of the 6 heating zones was the following:
T1=190° C.;
T2=200° C.;
T3=210° C.;
T4=210° C.;
T5=210° C.;
T6=210° C.

The compositions tested were prepared using Total Petrochemicals® PPH 7060 polypropylene in place of the Borealis® HB 205 TF polypropylene pellets and Luzenac® PR8218 talc and are shown in Table 12:

TABLE 12

|  | Example 18 | Comparative Example C13 |
| --- | --- | --- |
| PPH | 100 | 100 |
| Porous PP | 10 | 10 |
| DHBP | 0.2 | — |
| Irganox 1010 | 0.5 | 0.5 |
| Irgafos 168 | 0.5 | 0.5 |
| γ-ATM | 3.5 | — |
| Styrene | 1.6 | — |
| Talc | 50 | 50 |

Raw materials were all fed via barrel opening at 0 D, using gravimetric feeders Brabender Technologie® DSR28 and DDSR20. Liquids were first adsorbed onto Accure® XP100 porous polypropylene to allow feeding and a masterbatch of the powdery anti-oxidants into polypropylene base resin has been preliminarily prepared. Atmospheric venting was performed through barrel opening at 30 D. Total extrusion throughput was 3.5 kg/h.

The resulting compounds were then shaped into 4 mm thick multipurpose specimens conforming to ISO-3167 by injection molding according to ISO-294. The 4 mm thick multipurpose samples were cured at 90° C. for 24 hours in a water bath containing 1% acetic acid as a catalyst before testing. The heat deflection temperature (HDT) of the samples was measured according to ISO-75 method A and is recorded in Table 13.

TABLE 13

|  | Example 18 | Comparative Example C13 |
|---|---|---|
| HDT [° C.] | 108 | 99 |

The crosslinked grafted polypropylene compound of Example 18 has a higher heat deflection temperature, showing a much higher heat resistance, than the reference compound of Comparative Example C13. The performance improvement of polypropylene modified according to the invention vs. unmodified polypropylene is thus confirmed and significant in a talc filled system.

Similarly to the results described in Examples 18, compounds containing 30 w % of fiber glass have also been prepared and confirmed once again significant improvement of heat resistance of the compound prepared according to the invention.

Example 19

Coupling performances of polymer modified according to the invention when used as a coupling agent in fibre glass reinforced compounds were assessed in comparison to maleic anhydride grafted polypropylene coupling agent. Accelerated aging tests were also carried out on the fibre glass reinforced compounds containing each of the coupling agent.

Scaling-up of the batch process described in Example 14 above to continuous process was carried out on a Brabender® DSE 20/40 co-rotating twin screw extruder having screw diameter of 20 mm and L/D=40. Screws rotation speed was 250 rpm and temperature profile of the 6 heating zones was the following:

T1=190° C.;
T2=200° C.;
T3=210° C.;
T4=210° C.;
T5=210° C.;
T6=210° C.

The composition tested is called Example 19 and was prepared using Borealis® HB 205 TF polypropylene pellets and is shown in Table 14:

TABLE 14

|  | Example 19 |
|---|---|
| PP | 100 |
| Porous PP | 10 |
| DHBP | 0.2 |
| Irganox 1010 | 0.5 |
| Irgafos 168 | 0.5 |

TABLE 14-continued

|  | Example 19 |
|---|---|
| γ-ATM | 3.5 |
| Styrene | 1.6 |

Raw materials were all fed via barrel opening at 0 D, using gravimetric feeders Brabender Technologie® DSR28. Liquids were first adsorbed onto Accurel® XP100 porous polypropylene to allow feeding and a masterbatch of the powdery anti-oxidants into polypropylene base resin has been preliminarily prepared. Atmospheric venting was performed through barrel opening at 30 D. Total extrusion throughput was 3.5 kg/h.

The ability of the grafted polypropylene to act as a coupling agent for fibre glass was then tested by using 5 weight % of the grafted polypropylene of Example 19 as a coupling additive in a fibre glass reinforced composite formulation.

The MAg-PP mentioned above was tested in the same manner for comparison purposes.

Compounds were prepared according to the same continuous process as for Example 19. Process parameters were set the same and compounds prepared according to composition shown in Table 15:

TABLE 15

|  | Compound 3 | Compound 4 |
|---|---|---|
| RTP 100 | 65 | 65 |
| MAg-PP | 5 | — |
| Polymer Example 19 | — | 5 |
| Fiber Glass | 30 | 30 |

The resulting compounds were then shaped into 4 mm thick multipurpose specimens conforming to ISO-3167 by injection moulding according to ISO-294. The 4 mm thick multipurpose samples were not cured before testing. Mechanical performances of each compound were evaluated by tensile testing of these specimens according to ISO-527. Results obtained are shown in Table 16.

Specimens where then aged at 150° C. in a Binder® FD53 Oven with forced convection for 16 days and specimens regularly sampled for further tensile testing. Results are reported in Table 16.

TABLE 16

|  |  | Compound 3 | Compound 4 |
|---|---|---|---|
| Fresh | Tensile Modulus [MPa] | 6350 | 6944 |
|  | Tensile strength [MPa] | 81 | 86 |
|  | Elongation at break [%] | 3.2 | 3.1 |
| 7 days | Tensile Modulus [MPa] | 6444 | 7641 |
|  | Tensile strength [MPa] | 45 | 90 |
|  | Elongation at break [%] | 0.9 | 2.9 |
| 16 days | Tensile Modulus [MPa] | Not measurable | 7638 |
|  | Tensile strength [MPa] | 10 | 76 |
|  | Elongation at break [%] | 0.2 | 2.1 |

Results on fresh samples clearly show that when adding 5 wt % of the grafted polypropylene as coupling agent to the formulation, mechanical performances of the resulting fibre glass reinforced composite are improved at least to the same level and even beyond the performances achieved with maleic anhydride grafted polypropylene.

On top of it results on specimens aged for 7 days and 16 days at 150° C. show that performances of Compound 3 using MAg-PP drop much faster than those of Compound 4 using the polypropylene modified according to the invention.

Examples 20 and Comparative Examples C14 to C18

Studies in comparison to U.S. Pat. No. 6,864,323 were carried out. Comparative examples C14 to C18 were prepared from the procedure of Example 2 of U.S. Pat. No. 6,864,323 using a Brabender® Plastograph 350E mixer and amounts of reagents listed in Table 17 below. The Comparative Examples C14 to C18 described in Table 17 were prepared using vinyltrimethoxysilane in combination with either styrene, or siloxybutadiene or styrylsilane co-agents in respective amounts that are described in U.S. Pat. No. 6,864,323. The products were tested as described in Example 1 and the results are shown in Table 17.

Those latter results confirmed that the process described in U.S. Pat. No. 6,864,323 is not appropriate to prevent polypropylene resin degradation by β-scission and does not provide any valuable mean to modify polypropylene resin to the contrary of our present invention.

Examples 21 and 22 and Comparative Examples C19 and C20

Following the procedure of Example 1, grafted and crosslinked polypropylene samples were made using 40% by weight wood flours and the amounts of reagents in weight percents shown in Table 18.

In Example 21, 5% by weight of pre-grafted polypropylene prepared according to procedure used in Example 9 were

TABLE 17

|  | Comparative Example C14 | Comparative Example C15 | Comparative Example C16 | Comparative Example C17 | Comparative Example C18 | Example 20 | Example 14 |
|---|---|---|---|---|---|---|---|
| PP | 100 | 100 | 100 | 100 | 100 | 100 | 100 |
| Porous PP | 10 | 10 | 10 | 10 | 10 | 10 | 10 |
| DHBP | 0.2 | 0.2 | 0.2 | 0.2 | 0.2 | 0.2 | 0.2 |
| Irganox 1010 | 0.5 | 0.5 | 0.5 | 0.5 | 0.5 | 0.5 | 0.5 |
| Irgafos 168 | 0.5 | 0.5 | 0.5 | 0.5 | 0.5 | 0.5 | 0.5 |
| γ-ATM silane | — | — | — | — | — | 3.5 | 3.5 |
| Styrene | 1.4 | — | — | — | — | — | 1.6 |
| VTM silane | 2.0 | 2.0 | 2.0 | 2.0 | 2.0 | — | — |
| Styryl-silane | — | — | — | 0.07 | 0.24 | — | — |
| Siloxybutadiene-silane | — | 0.07 | 0.24 | — | — | — | — |
| Torque (Nm) | 41 | 14 | 19 | 16 | 20 | 22 | 39 |
| G' @ 12% strain After Cure [kPa] | 13 | 2 | 3 | 2 | 4 | 22 | 41 |
| % gel content | 0 | 0 | 0 | 0 | 0 | 65 | 88 |

The torque results in Table 17 show that formulations of comparative examples do not allow proper prevention of the polypropylene degradation except for Comparative example C14 where styrene contributes to prevent this degradation.

From the G' values in Table 17 we can conclude that the polymers of Examples 20 and 14 have cured to a high crosslink density, since G' @12% strain are much higher than that of the reference PP in Comparative Example C2 in Table 1. On the other hand Comparative examples C14 to C18 show extremely low G' values, similar to Comparative Example C1 in Table 1, which indicates significant polypropylene degradation by β-scission and almost complete absence of crosslinking since VTM silane was effectively not grafting to polypropylene in the conditions described in U.S. Pat. No. 6,864,323.

Gel content results in Table 17 confirm those from G' @12% strain. Indeed the gel contents of Examples 20 and 14 are high and gel contents for Comparative examples C14 to C18 were "zero".

added as coupling agent between wood flours and polypropylene. In Example 22, the silane grafting reaction onto polypropylene was occurring in-situ during the compounding of wood flours into polypropylene.

The products were tested as described in Example 1 for torque and elastic shear modulus (G') and the results are shown in Table 18. The resulting compounds were also shaped into 4 mm thick plates by compression moulding on Agila® PE30 press at 210° C. for 5 minutes before cooling down to ambient temperature at 15° C./min with further pressing. Tensile specimens according to ISO-527 type 1B were cut out of the moulded sheets with a Ray-Ran® Polytest CNC cutting mill. The 4 mm thick samples were not cured before testing. Mechanical performances of each compound were evaluated by tensile testing of these specimens according to ISO-527. Results obtained are shown in Table 18.

TABLE 18

|  | Example 21 | Example 22 | Comparative Example C19 | Comparative Example C20 |
|---|---|---|---|---|
| PP | 49.3 | 52.1 | 49.3 | 54.3 |
| Porous PP | 5 | 5 | 5 | 5 |
| Wood Flours | 40 | 40 | 40 | 40 |
| DHBP | — | 0.05 | — | — |
| Irganox1010 | 0.35 | 0.35 | 0.35 | 0.35 |
| Irgafos 168 | 0.35 | 0.35 | 0.35 | 0.35 |
| γ-ATM | — | 1.5 | — | — |
| Styrene | — | 0.7 | — | — |
| γ-ATM grafted PP | 5 | — | — | — |

TABLE 18-continued

|  | Example 21 | Example 22 | Comparative Example C19 | Comparative Example C20 |
|---|---|---|---|---|
| Maleic Anhydride grafted PP (MAg-PP) | — | — | 5 | — |
| Torque (Nm) | 65 | 55 | 56 | 47 |
| G' @ 12% strain After Cure [kPa] | 55 | 106 | 50 | 44 |
| Tensile strength max. (MPa) | 34 | 44 | 31 | 18 |
| Tensile modulus (MPa) | 3260 | 3713 | 2989 | 2529 |
| Tensile strain max. (%) | 1.7 | 2.5 | 1.6 | 1.2 |
| Water uptake (%) - day 1 | 1.8 | 1.8 | 4.8 | 2.2 |
| Water uptake (%) - day 3 | 2.2 | 2.4 | 5.8 | 3.3 |
| Water uptake (%) - day 15 | 3.8 | 3.7 | 8.4 | 6.3 |
| Water uptake (%) - day 31 | 5.1 | 5.1 | 10.3 | 9.0 |

From the G' values in Table 18 we can conclude that the composites of Examples 21 has cured to a similar or slightly higher degree of crosslink density, since G' @12% strain is slightly higher than that of the reference coupling agent technology, MAg-PP in Comparative Example C19. When the coupling was made in-situ as in Example 22, much higher G' value was obtained.

From tensile strength, modulus and strain values in Table 18 we can conclude that the composites of Examples 21 and 22 have much better mechanical properties than that of the reference coupling agent technology, MAg-PP in Comparative Example C19 and that of the composite without any coupling agent as in Comparative Example C20.

Water uptake tests were carried out upon immersion of specimens in demineralized water at room temperature. The percentage of water uptake was computed as the ratio of the difference between the sample weight after a given period of immersion underwater and the initial weight before immersion underwater to initial weight, expressed in percent.

From water uptake values in Table 18 we can conclude that the composites of Examples 21 and 22 have much better resistance to water uptake than that of the reference coupling agent technology, MAg-PP in Comparative Example C19 and that of the composite without any coupling agent as in Comparative Example C20.

Examples 23 and 24, and Comparative Examples C21 and C22

Following the procedure of Example 9, grafted and crosslinked polypropylene samples were made according to a continuous extrusion process using 30% by weight wood flours and the amounts of reagents shown in Table 19. The coupling between wood flours and polypropylene was made in-situ according to the procedure used for Example 22.

The resulting compounds were then shaped into 4 mm thick multipurpose specimens conforming to ISO-3167 by injection moulding according to ISO-294. Mechanical performances of each compound were evaluated by tensile testing of these uncured specimens according to ISO-527. Impact strengths were also measured on these uncured specimens according to Charpy method ISO179-2 on un-notched specimens. Results obtained are shown in Table 19.

TABLE 19

|  | Example 23 | Example 24 | Comparative Example C21 | Comparative Example C22 |
|---|---|---|---|---|
| PPH | 53.4 | 53.3 | 51.0 | 55.1 |
| Porous PP | 5 | 5 | 5 | 5 |
| Wood Flours | 30 | 30 | 30 | 30 |
| DHBP | 0.05 | 0.05 | — | — |
| Irganox 1010 | 0.3 | 0.3 | 0.3 | 0.3 |
| Irgafos 168 | 0.3 | 0.3 | 0.3 | 0.3 |
| γ-ATM | 1.5 | 1.5 | — | — |
| Styrene | 0.7 | — | — | — |
| Ethylsorbate | — | 0.9 | — | — |
| Maleic Anhydride grafted PP (MAg-PP) | — | — | 5 | — |
| G' @ 12% strain After Cure [kPa] | 18 | 30 | 13 | 13 |
| Tensile strength max. (MPa) | 45.1 | 48.0 | 41.2 | 30.5 |
| Tensile modulus (MPa) | 2840 | 3010 | 2863 | 2695 |
| Tensile strain max. (%) | 4.5 | 4.9 | 3.4 | 3.6 |
| Impact (Charpy, un-notched, kJ/m$^2$) | 20 +/− 2 | 23 +/− 3 | 19 +/− 2 | 16 +/− 2 |
| Water uptake (%) - day 1 | 0.2 | 0.2 | 0.3 | 0.3 |
| Water uptake (%) - day 5 | 0.5 | 0.5 | 0.6 | 0.6 |
| Water uptake (%) - day 8 | 0.7 | 0.6 | 0.7 | 0.9 |
| Water uptake (%) - day 15 | 0.7 | 0.7 | 0.8 | 1.0 |
| Water uptake (%) - day 25 | 0.9 | 0.9 | 1.0 | 1.3 |
| Water uptake (%) - day 32 | 1.0 | 1.0 | 1.2 | 1.4 |

From tensile strength, modulus and strain values in Table 19 we can conclude that the composites of Examples 23 and 24 have quite similar or better mechanical properties than that of the reference coupling agent technology, MAg-PP in Comparative Example C21 and that of the composite without any coupling agent as in Comparative Example C22.

From impact strength values in Table 19 we can conclude that the composites of Examples 23 and 24 have slightly better resistance to impact than that of the reference coupling agent technology, MAg-PP in Comparative Example C21 and that of the composite without any coupling agent as in Comparative Example C22.

From water uptake values in Table 19 we can conclude that the composites of Examples 23 and 24 have significantly better resistance to water uptake than that of the reference coupling agent technology, MAg-PP in Comparative Example C21 and that of the composite without any coupling agent as in Comparative Example C22.

Examples 25 to 28

Following the procedure of Example 1, grafted and crosslinked polypropylene samples were made in presence and absence of dioctyltindilaurate (DOTDL) catalyst added at the end of the mixing step in the roller blades mixer and the amounts of reagents shown in Table 20. Naphthenic processing oil was NyflexR 222B from Nynas with a viscosity of 104 cSt (40° C., method ASTM D445) and specific gravity 0.892 g/cm3 (method ASTM D4052). α-ATM was acryloxymethyltrimethoxysilane prepared from acrylic acid and chloromethyltrimethoxysilane according to the process described in U.S. Pat. No. 3,179,612.

To the contrary of prior Example 1, the curing was carried out underwater at 95° C. in absence of any additional crosslinking catalyst diluted in the water bath. Therefore, the effect of the addition of DOTDL catalyst in the material itself was evaluated.

TABLE 20

|  | Example 25 | Example 26 | Example 27 | Example 28 |
| --- | --- | --- | --- | --- |
| PP | 100 | 100 | 100 | 100 |
| Porous PP | 10 | 10 | 10 | 10 |
| DHBP | 0.2 | 0.2 | 0.2 | 0.2 |
| Irganox 1010 | 0.5 | 0.5 | 0.5 | 0.5 |
| Irgafos 168 | 0.5 | 0.5 | 0.5 | 0.5 |
| γ-ATM | 3.5 | 3.5 | — | — |
| α-ATM | — | — | 3.1 | 3.1 |
| Styrene | 1.56 | 1.56 | 1.56 | 1.56 |
| DOTDL | — | 0.04 | — | 0.04 |
| Parrafinic oil | 2.4 | 2.4 | 2.4 | 2.4 |
| Torque (Nm) | 38.3 | 44.1 | 43.6 | 44.9 |
| G' @ 12% strain Before Cure [kPa] | 11.0 | 12.6 | 11.5 | 17.7 |
| G' @ 12% strain After Cure [kPa] | 21.5 | 33.4 | 43.2 | 30.5 |
| Gel content (%) | 74 | 77 | 76 | 77 |

The analysis of elastic shear modulus (G') values shown in Table 20 indicates that, in absence of DOTDL catalyst (Examples 25 and 27), about twice higher value was obtained with α-ATM against γ-ATM after curing the specimens underwater at 95° C. for 24 hours. This attests of the fast curing achieved with α-ATM against γ-ATM. In presence of DOTDL catalyst (Examples 26 and 28), the difference was less pronounced. These observations indicate that tin catalyst is accelerating the condensation of silylalkoxy groups grafted onto the PP resin backbone, and therefore is offsetting the differences between specimens. These results also indicate that α-ATM does not require the use of a condensation catalyst (e.g., DOTDL) for achieving complete crosslinking in the material.

The invention claimed is:

1. A process for grafting hydrolysable silane groups to a polyolefin in which ethylene units, if present, form less than 50% by weight of the total polyolefin, the process comprising reacting the polyolefin with an unsaturated silane, having at least one hydrolysable group bonded to Si, or a hydrolysate thereof, in the presence of means capable of generating free radical sites in the polyolefin and a co-agent comprising a sorbate ester, a 2,4-pentadienoate, or a cyclic derivative thereof, characterised in that the silane has the formula R"—CH=CH—Z (I) or R"—C≡C—Z (II) in which Z represents an electron-withdrawing moiety substituted by a —SiR$_a$R'$_{(3-a)}$ group wherein R represents a hydrolysable group; R' represents a hydrocarbyl group having 1 to 6 carbon atoms; a has a value in the range 1 to 3 inclusive; and R" represents hydrogen or a group having an electron withdrawing effect or any other activation effect with respect to the —CH=CH— or —C≡C— bond.

2. A process according to claim 1 characterised in that the polyolefin comprises at least 50% by weight units of an olefin having 3 to 8 carbon atoms.

3. A process according to claim 1 characterised in that the grafting reaction is carried out in the presence of a co-agent which inhibits polymer degradation by beta scission in the presence of a compound capable of generating free radical sites in the polyolefin.

4. A process according to claim 1 characterised in that the co-agent is present at 0.1 to 15.0% by weight of the total composition.

5. A process according to claim 1 characterised in that each group R in the unsaturated silane (I) or (II) is an alkoxy group.

6. A process according to claim 1 characterised in that the unsaturated silane (I) or (II) is partially hydrolyzed and condensed into oligomers.

7. A process according to claim 1 characterised in that the silane has the formula R"—CH=CH—X—Y—SiR$_a$R'$_{(3-a)}$ (III) or R"—C≡C—X—Y—SiR$_a$R'$_{(3-a)}$ (IV) in which X represents a chemical linkage having an electron withdrawing effect with respect to the —CH=CH— or —C≡C— bond, and Y represents a divalent organic spacer linkage comprising at least one carbon atom separating the linkage X from the Si atom.

8. A process according to claim 7 characterised in that the silane has the formula R"—CH=CH—X—Y—SiR$_a$R'$_{(3-a)}$ (III) and the moiety R"—CH=CH—X—Y— is an acryloxyalkyl group.

9. A process according to claim 8 characterised in that the unsaturated silane (I) comprises γ-acryloxypropyltrimethoxysilane and/or acryloxymethyltrimethoxysilane.

10. A process according to claim 9 characterised in that the unsaturated silane (I) comprises a blend of γ-acryloxypropyltrimethoxysilane with acryloxymethyltrimethoxysilane or a blend or γ-acryloxypropyltrimethoxysilane or acryloxymethyltrimethoxysilane with vinyltrimethoxysilane or methacryloxytrimethoxysilane.

11. A process according to claim 9 characterised in that the group R" in the unsaturated silane (III) and (IV) is an electron withdrawing group of the formula —X—Y—SiR$_a$R'$_{(3-a)}$.

12. A process according to claim 11 characterised in that the unsaturated silane (III) comprises a bis(trialkoxysilylalkyl) fumarate and/or a bis(trialkoxysilylalkyl) maleate.

13. A process according to claim 1 characterised in that the unsaturated silane (I) or (II) is present at 0.5 to 15.0% by weight of the total composition.

14. A process according to claim 1 characterised in that an organic peroxide compound capable of generating free radical sites in the polymer is present at 0.01 to 2% by weight of the total composition.

15. A process according to claim 1 characterised in that the unsaturated silane (I) or (II) is deposited on a filler before being reacted with the polymer.

16. A process according to claim 1 characterised in that the polymer, unsaturated silane (I) or (II) and filler are reacted in situ.

17. A polyolefin grafted with hydrolysable silane groups in which less than 50% by weight of the total units in the polyolefin being ethylene units, characterised in that the polyolefin contains grafted moieties of the formula R"—CH(PP)—CH$_2$—Z and/or grafted moieties of the formula R"—CH$_2$—CH(PP)—Z wherein Z represents an electron-withdrawing moiety substituted by a —SiR$_a$R'$_{(3-a)}$ group wherein R represents a hydrolysable group; R' represents a hydrocarbyl group having 1 to 6 carbon atoms; a has a value in the range 1 to 3 inclusive; R" represents hydrogen or a group having an electron withdrawing effect or any other activation effect and PP represents a polyolefin chain in which less than 50% by weight of the total units in the polyolefin are ethylene units, and wherein the grafted moieties are grafted onto the polyolefin in the presence of a co-agent comprising a sorbate ester, a 2,4-pentadienoate, or a cyclic derivative thereof.

18. A process for crosslinking a polymer in which ethylene units, if present, form less than 50% by weight of the total polymer, characterised in that the grafted polymer according to claim 17 is exposed to moisture in either the presence or the absence of a silanol condensation catalyst.

19. A process according to claim 18 characterised in that the grafted polymer is shaped into an article and subsequently crosslinked by exposure to moisture.

20. A process for forming a foamed polymer, characterised by adding a blowing agent, moisture and condensation catalyst together to the grafted polymer according to claim 17.

* * * * *